United States Patent
Omata et al.

(10) Patent No.: US 9,209,723 B2
(45) Date of Patent: Dec. 8, 2015

(54) CONTROL DEVICE OF AC MOTOR

(71) Applicant: DENSO CORPORATION, Kariya, Aichi-pref. (JP)

(72) Inventors: Ryuji Omata, Anjo (JP); Takahumi Oowada, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 14/458,516

(22) Filed: Aug. 13, 2014

(65) Prior Publication Data

US 2015/0054438 A1 Feb. 26, 2015

(30) Foreign Application Priority Data

Aug. 20, 2013 (JP) ................ 2013-170194

(51) Int. Cl.
*H03K 5/00* (2006.01)
*H02P 6/00* (2006.01)
*H02P 21/14* (2006.01)

(52) U.S. Cl.
CPC .............. *H02P 6/002* (2013.01); *H02P 21/148* (2013.01)

(58) Field of Classification Search
CPC ..... H02P 21/0035; H02P 21/14; H02P 6/002; H02P 27/06
USPC ............. 318/400.13, 400.02, 400.12, 400.17, 318/400.26, 400.37, 722, 430, 490
See application file for complete search history.

(56) References Cited

U.S. PATENT DOCUMENTS

| | | | | |
|---|---|---|---|---|
| 6,462,492 B1* | 10/2002 | Sakamoto | .............. | H02P 6/18 318/400.02 |
| 6,825,637 B2* | 11/2004 | Kinpara | ................. | H02P 6/14 318/560 |
| 7,598,698 B2* | 10/2009 | Hashimoto | ........... | H02P 21/146 318/798 |
| 7,750,595 B2* | 7/2010 | Yamada | .............. | H02P 23/0027 318/767 |
| 7,911,165 B2* | 3/2011 | Peyras | .................... | H02P 21/06 318/400.02 |
| 2010/0123418 A1 | 5/2010 | Itoh et al. | | |
| 2013/0214709 A1 | 8/2013 | Omata et al. | | |
| 2013/0214710 A1 | 8/2013 | Omata et al. | | |
| 2014/0103844 A1 | 4/2014 | Omata et al. | | |
| 2014/0117893 A1 | 5/2014 | Omata et al. | | |

FOREIGN PATENT DOCUMENTS

JP 2004-159391 6/2004

OTHER PUBLICATIONS

Omata et al., U.S. Appl. No. 14/458,503, filed Aug. 13, 2014.
Omata et al., U.S. Appl. No. 14/458,489, filed Aug. 13, 2014.

* cited by examiner

*Primary Examiner* — Bentsu Ro
*Assistant Examiner* — Thai Dinh
(74) *Attorney, Agent, or Firm* — Nixon & Vanderhye PC

(57) ABSTRACT

A control device of a three-phase AC motor includes: an inverter; a current sensor for a sensor phase current; and a controller switching a switching element of each phase of the inverter and having a current estimation device, which calculates a sensor-phase-standard current phase according to α and β axis currents and a current estimated value of another phase. The current estimation device calculates the α axis current at every switching and intermediate timings, calculates a first differential value of the α axis current at every switch timing, calculates the β axis current according to the first differential value, calculates a second differential value of the α axis current at every intermediate timing, and calculates the β axis current according to the second differential value. The intermediate timing is set to have an unequal interval between two adjacent switch timings.

5 Claims, 11 Drawing Sheets

FIG. 3

| FB CONT MODE | CUR FB CONT | | TOR FB CONT |
|---|---|---|---|
| CONT MODE | SINE WAVE PWM | OVERMODUL PWM | SQ WAVE (1 PULSE) |
| OUT VOL WAVEFORM OF INV | FUND WAVE COMP | FUND WAVE COMP | FUND WAVE COMP |
| MOD FACTOR | 0 TO APPR 0.61 | MAX IN SINE WAVE PWM – 0.78 | 0.78 |
| FEATURE | SMALL VAR IN TORQUE | OUT IMPROVE IN MID SP RANGE | OUT IMPROVE IN HIGH SP RANGE |

3-PH WAVEFORM OF CUR SENSED VAL AT SW TIMING

3-PH WAVEFORM OF CUR SENSED VAL AT INTERMED TIMING

CONTROL DEVICE OF AC MOTOR

CROSS REFERENCE TO RELATED APPLICATION

This application is based on Japanese Patent Application No. 2013-170194 filed on Aug. 20, 2013, the disclosure of which is incorporated herein by reference.

TECHNICAL FIELD

The present disclosure relates to a control device of an AC motor that senses a phase current of one phase among three phases by a current sensor and that controls a current flowing through an AC motor.

BACKGROUND

In recent years, from a social requirement of a lower fuel consumption and a less exhaust emission, an electric vehicle and a hybrid vehicle, each of which is mounted with an AC motor as a power source of a vehicle, is drawing attention. For example, in some of the hybrid vehicles, a DC power source made of a secondary battery or the like and an AC motor are connected to each other via an electric power conversion unit constructed of an inverter and the like, and a DC voltage of the DC power source is converted into an AC voltage by the inverter to thereby drive the AC motor.

In a control device of an AC motor mounted in the hybrid vehicle and the electric vehicle like this, there has been known a technique in which a current sensor for sensing a phase current is not provided in two phases or three phases but is provided only in one phase to thereby reduce the number of the current sensors, thereby reducing the size of a portion near a three phase output terminal of the inverter and reducing the cost of a control system of the AC motor. For example, in a patent document 1 is described a control device of a three-phase AC motor that calculates a current estimated value of a phase (for example, U phase and V phase) other than "a sensor phase" (for example, W phase) on the basis of a current sensed value of the sensor phase of the one phase sensed by one current sensor, a d axis current command value and a q axis current command value, and an electric angle of the AC motor.

Further, as a control mode of an AC motor have been known "a square wave control mode" capable of increasing a voltage utilization factor more than a sine wave PWM control mode or an overmodulated PWM control mode, which is generally employed. The square wave control mode is different from the sine wave PWM control mode or the overmodulated PWM control mode, which feeds back a d axis current and a q axis current, which are calculated on the sensed values of two current sensors, to make the d axis current and the q axis current follow a d axis current command value and a q axis current command value, and calculates an estimated torque from the d axis current and the q axis current, which are calculated on the basis of the sensed values of the two current sensors, and feeds back the estimated torque to a torque command value so as to make the estimated torque follow the torque command value, thereby controlling a phase of a square wave voltage. In a patent document 2 is described a control device of an AC motor which is provided with two current sensors and senses two phase currents in the square wave control mode by the two current sensors.

By the way, an AC motor mounted in a hybrid vehicle and an electric vehicle is used in the wider ranges of the number of revolutions and an output torque as compared with an AC motor in the other technical field, so that it is desired that the AC motor mounted in the hybrid vehicle and the electric vehicle can be applied to a sine wave PWM control mode and an overmodulated PWM control mode, which correspond to "a current feedback control mode", and a square wave control mode, which corresponds to "a torque feedback control mode". The square wave control mode is employed in a high rotation operating range, in particular, in which a weak field control for preventing a counter electromotive force is required and minimizes an absolute value of a weak field current of a minus d axis current. Further, the square wave control mode can minimize the number of switchings of an inverter to thereby reduce a switching loss. From these characteristics, in the drive control of a motor generator of the hybrid vehicle and the electric vehicle, it is effective to switch and use various control modes in combination according to the operating state of the number of revolutions and the output torque, that is, according to a voltage required for driving the electric motor in such a way that: the sine wave control mode is used in a low rotation range; the overmodulated control mode is used in a middle rotation range; and the square wave control mode is used in a high rotation range. However, "the torque feedback control mode" described in the patent document 2 does not use a d axis current command value and a q axis current command value, so that the technique described in the patent document 1 applied to "the current feedback control mode" cannot be applied to a control mode described in the patent document 2.

[Patent document 1] JP-A-2004-159391
[Patent document 2] JP-A-2010-124544 (corresponding to US 2010/0123418)

SUMMARY

It is an object of the present disclosure to provide a control device of an AC motor that calculates a current estimated value of another phase on the basis of a current sensed value of one phase sensed at an arbitrary timing without using a d axis current command value and a q axis current command value.

According to an aspect of the present disclosure, a control device of a three-phase AC motor includes: an inverter that drives the AC motor; a current sensor that senses a current flowing through a sensor phase of the AC motor; and a controller that includes a current estimation device. The current estimation device calculates a current phase based on the sensor phase, which is defined as a sensor-phase-standard current phase, according to an α axis current and a β axis current in a fixed coordinate system. The fixed coordinate system is set by an α axis and a β axis. The α axis is in a same direction as an axis of the sensor phase. The β axis is orthogonal to the axis of the sensor phase. The current estimation device calculates a current estimated value of another phase other than the sensor phase according to the sensor-phase-standard current phase and a current sensed value of the sensor phase. The current sensed value of the sensor phase is sensed by the current sensor. The controller switches on and off a switching element of each phase of the inverter so as to control a current flowing through the AC motor. The current estimation device includes: a first calculator that calculates the α axis current according to the current sensed value of the sensor phase at every switch timing and every intermediate timing, the switch timing at which the switching element switches on or off, and the intermediate timing being different from the switch timing; and a second calculator that calculates a first differential value of the α axis current at every switch timing according to a change amount of the α axis current between a present switch timing and a previous switch timing. The second calculator calculates the β axis current according to the first differential value of the α axis current. The second calculator calculates a second differential value of the α axis current at every intermediate timing according to a change amount of the α axis current between a present intermediate timing and a previous intermediate timing. The second calculator calculates the β axis current according to the second differential value of the α axis current. The intermediate timing is set to have an unequal interval between two adjacent switch timings.

In the above device, the β axis current can be calculated without using a current command value of the other phase. Hence, the accuracy of calculation of the current estimated value of the other phase can be improved by taking into consideration the harmonic components of the actual current phase and the effect of variations that can be usually caused. Further, the β axis current can be calculated with high accuracy with being little affected by the current sensed value increasing and decreasing irregularly between the switch timing and the intermediate timing. Hence, the accuracy of calculation of the sensor phase reference current phase based on the α axis current and the β axis current can be improved. Furthermore, the current of the sensor phase can be sensed by the current sensor at an arbitrary timing between the consecutive switch timings. Hence, a timing suitable for the operating state of the AC motor can be set.

BRIEF DESCRIPTION OF THE DRAWINGS

The above and other objects, features and advantages of the present disclosure will become more apparent from the following detailed description made with reference to the accompanying drawings. In the drawings:

FIG. 3 is an illustration to schematically illustrate a control mode of an AC motor;

DETAILED DESCRIPTION

Hereinafter, the embodiments of the present disclosure will be described on the basis of the drawings.

An Embodiment

Figure 1:
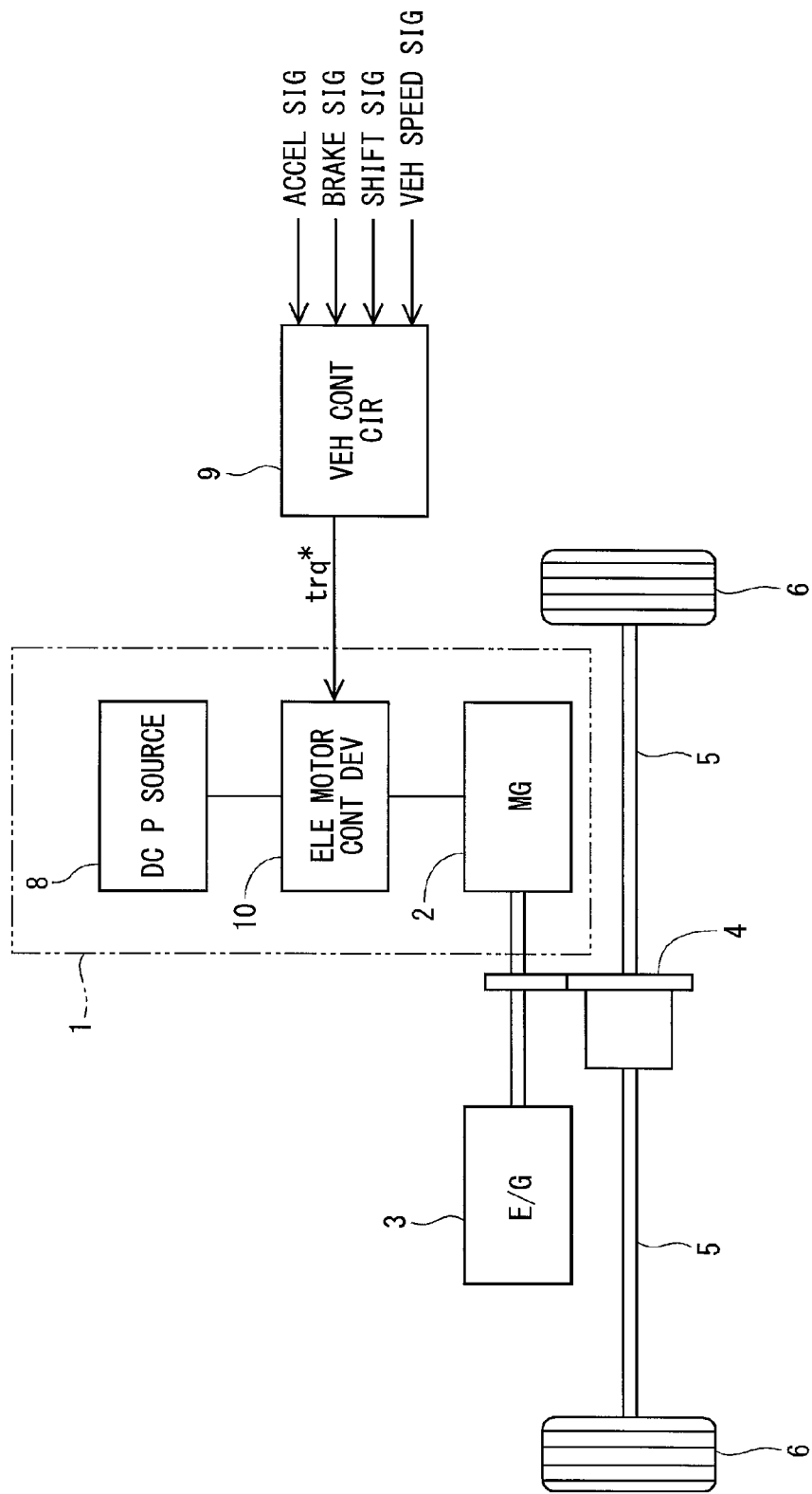
FIG. 1 is a diagram to show a construction of an electric motor drive system to which a control device of an AC motor according to an embodiment of the present disclosure is applied.

An electric motor control device 10 as "a control device of an AC motor" according to an embodiment of the present disclosure, as shown in FIG. 1, is applied to an electric motor drive system 1 for driving a hybrid vehicle.

The electric motor drive system 1 has an AC motor 2, a DC power source 8, and the electric motor control device 10. The AC motor 2 is an electric motor for generating torque for driving the driving wheels 6 of an electrically driven vehicle. The AC motor 2 of the present embodiment is a three-phase AC motor of a permanent magnet synchronous type.

The electrically driven vehicle includes a vehicle for driving the driving wheels 6 by an electric energy such as a hybrid vehicle, an electric vehicle, and a fuel cell electric vehicle. The electrically driven vehicle of the present embodiment is a hybrid vehicle provided with an engine 3 and the AC motor 2 is a so-called motor generator (designated by "MG" in the drawings) having a function as an electric motor for generating torque to drive the driving wheels 6 and a function as a generator which is driven by the kinetic energy of the vehicle, transmitted from the engine 3 and the driving wheels 6, and which can generate electricity.

The AC motor 2 is coupled to an axle 5 via a gear 4, for example, a transmission or the like. In this way, the driving force of the AC motor 2 drives driving wheels 6 via the gear 4 and the axle 5.

The DC power source 8 is an electricity storage device that can charge and discharge electricity, for example, a secondary battery such as a nickel metal hydride battery or a lithium ion battery, and an electric double-layer capacitor. The DC power source 8 is connected to an inverter 12 (refer to FIG. 2) of the electric motor control device 10, that is, the DC power source 8 is so constructed as to supply electricity to the AC motor 2 and to be supplied with electricity from the AC motor 2 via the inverter 12.

A vehicle control circuit 9 is constructed of a microcomputer and the like and is provided therein with a CPU, a ROM, an I/O, and a bus line for connecting these elements, all of which are not shown in the drawings. The vehicle control circuit 9 controls the whole of the electrically driven vehicle by software processing, which is performed by executing previously stored programs by the CPU, and by hardware processing, which is performed by a dedicated electronic circuit.

The vehicle control circuit 9 is constructed so as to be able to acquire the signals of various kinds of sensors and switches, for example, an accelerator signal from an accelerator, a brake signal from a brake switch, and a shift signal from a shift switch, all of which are not shown in the drawing. The vehicle control circuit 9 senses the driving state of the vehicle on the basis of the acquired signals and outputs a torque command value trq* corresponding to the driving state to the electric motor control device 10. Further, the vehicle control circuit 9 outputs a command signal to an engine control circuit (not shown in the drawing) for controlling the operation of the engine 3.

Figure 2:
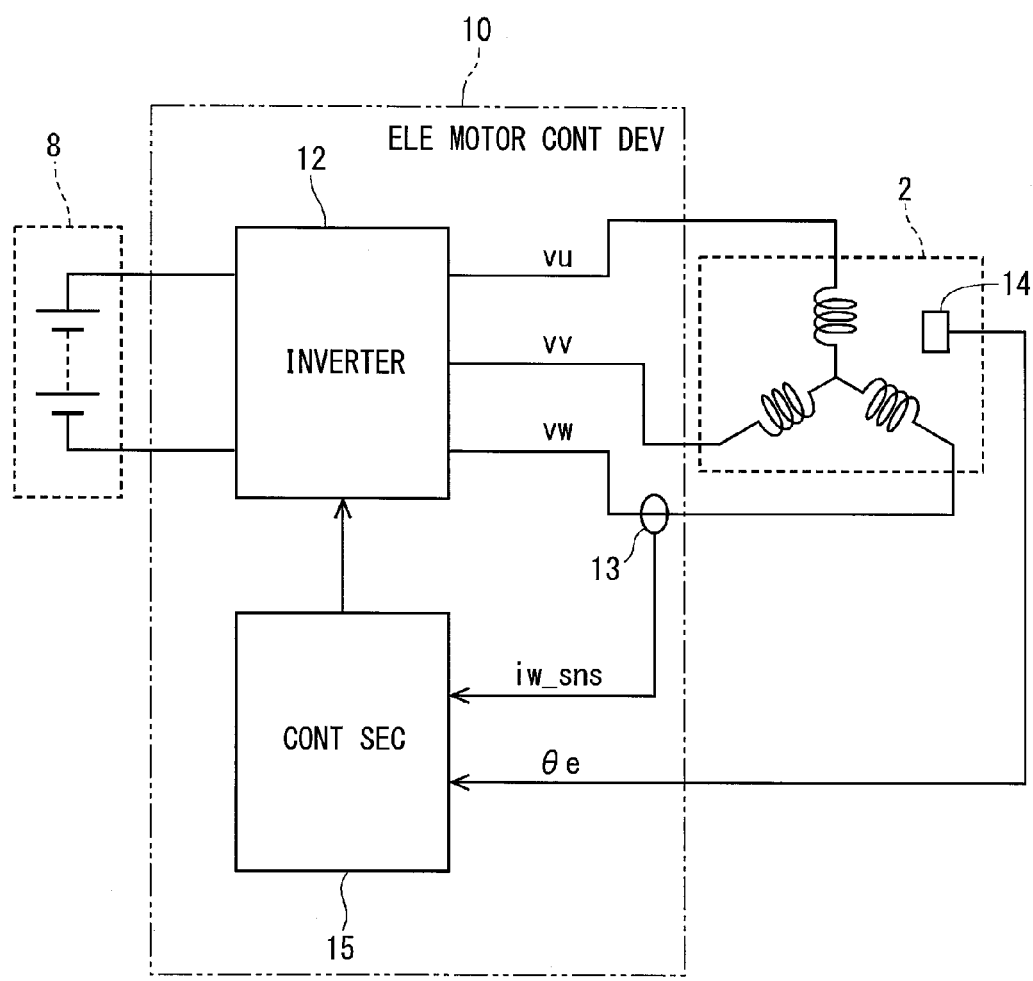
FIG. 2 is a general construction diagram of the control device of the AC motor according to the embodiment of the present disclosure.

The electric motor control device 10, as shown in FIG. 2, has an inverter 12, a current sensor 13, a rotation angle sensor 14, and a control section 15 as "a controller."

The inverter 12 has a boost voltage of the DC power source by a boost converter (not shown in the drawing) inputted thereto as a system voltage VH. The inverter 12 has six switching elements (not shown in the drawing) connected in a bridge mode. As to the switching element, for example, an IGBT (Insulated Gate Bipolar Transistor), a MOS (Metal Oxide Semiconductor) transistor, and a bipolar transistor can be used for the switching element. The switching elements are switched on and off on the basis of signals UU, UL, VU, VL, WU, WL outputted from a signal generator 55 of the control section 15, whereby the drive of the AC motor 2 is controlled on the basis of three phase AC voltages vu, w, vw to be impressed on the AC motor 2 (refer to FIG. 4).

The current sensor 13 is provided in any one phase of the AC motor 2. In the present embodiment, the current sensor 13 is provided in a W phase. Hereinafter, the W phase in which the first current sensor 13 is provided is referred to as "a sensor phase". The current sensor 13 senses a phase current of the W phase as a current sensed value iw_sns of the sensor phase and outputs the current sensed value iw_sns to the control section 15.

Hereinafter, in the description of the present embodiment, the description will be made on the premise of a construction in which the sensor phase is the W phase. However, in the other embodiments, a U phase or a V phase may be the sensor phase.

The rotation angle sensor 14 is provided near a rotor (not shown in the drawing) of the AC motor 2 and senses an electric angle θe and outputs the sensed electric angle θe to the control section 15. Further, the number of revolutions N of the rotor of the AC motor 2 is calculated on the basis of the electric angle θe sensed by the rotation angle sensor 14. The rotation angle sensor 14 of the present embodiment is a resolver, but another kind of sensor, for example, a rotary encoder or the like may be used.

The control section 15 is constructed of a microcomputer and the like and is provided therein with a CPU, a ROM, an I/O, and a bus line for connecting these elements, all of which are not shown in the drawings. The control section 15 controls an action of the AC motor 2 by software processing, which is performed by executing previously stored programs by the CPU, and by hardware processing, which is performed by a dedicated electronic circuit.

According to the number of revolutions N of the rotor of the AC motor 2 based on the electric angle θe sensed by the rotation angle sensor 14 and to a torque command value trq* from the vehicle control circuit 9, the electric motor control device 10 drives the AC motor 2 as an electric motor, whereby the AC motor 2 performs "a powering operation as an electric motor" and consumes electricity, or drives the AC motor 2 as a generator, whereby the AC motor 2 performs "a regenerating operation as a generator" and generates electricity. Specifically, according to the number of revolutions N and whether the torque command value trq* is plus or minus, the electric motor control device 10 switches the action of the AC motor 2 into the following four patterns:

<1. Normal rotation/powering operation> when the number of revolutions N is plus and the torque command value trq* is plus, the AC motor 2 consumes electricity;

<2. Normal rotation/regenerating operation> when the number of revolutions N is plus and the torque command value trq* is minus, the AC motor 2 generates electricity;

<3. Reverse rotation/powering operation> when the number of revolutions N is minus and the torque command value trq* is minus, the AC motor 2 consumes electricity; and <4. Reverse rotation/regenerating operation> when the number of revolutions N is minus and the torque command value trq* is plus, the AC motor 2 generates electricity.

In the case where the number of revolutions N>0 (normal rotation) and the torque command value trq*>0, or the number of revolutions N<0 (reverse rotation) and the torque command value trq*<0, the inverter 12 converts a DC electricity supplied from the DC power source 8 to an AC electricity by switching on/off the switching elements, thereby driving the AC motor 2 in such a way as to output torque (to perform a powering operation).

On the other hand, in the case where the number of revolutions N>0 (normal rotation) and the torque command value trq*<0, or the number of revolutions N<0 (reverse rotation) and the torque command value trq*>0, the inverter 12 converts an AC electricity generated by the AC motor 2 to a DC electricity by switching on/off the switching elements, thereby supplying the DC electricity to the DC power source 8, whereby the AC motor 2 performs a regenerating operation.

Here, a control mode of the AC motor 2 performed by the electric motor control device 10 of the present embodiment will be described with reference to FIG. 3. The electric motor control device 10 switches three control modes shown in FIG. 3 for an electricity conversion in the inverter 12 to thereby control the AC motor 2.

A sine wave PWM control mode (hereinafter referred to as "sine wave control mode") is used as an ordinary PWM control and controls the switching on/off of the switching elements of the upper and lower arms of each phase according to a voltage comparison between a voltage command shaped like a sine wave and a carrier wave typified by a triangle wave. In this way, duty is controlled in such a way that a fundamental wave component of a current becomes a sine wave in one period of the current for a set of a high level voltage period, which corresponds to a period in which the switching elements of the upper arm is on, and a low level voltage period, which corresponds to a period in which the switching elements of the lower arm is on.

In the sine wave control mode, an amplitude of the voltage command shaped like the sine wave is limited to a range not more than an amplitude of the carrier wave. For this reason, in the sine wave control mode, a fundamental wave component of voltage to be impressed on the AC motor 2 can only be increased to approximately 0.61 times the system voltage VH, which is an input DC voltage to be impressed on the inverter 12. Hereinafter, a ratio of the fundamental wave component (effective value) of a line voltage of the AC motor 2 to the system voltage VH to be impressed on the inverter 12 is referred to as "a modulation factor".

In the sine wave control mode, the amplitude of the voltage command of the sine wave is in a range not more than the amplitude of the carrier wave, so that a line voltage to be impressed on the AC motor 2 becomes a sine wave. Further, it is assumed that a control mode of superimposing a 3 k-th harmonic wave component (k: natural number) to a sine wave component of a range not more than the amplitude of the carrier wave to thereby generate a voltage command will be included in the sine wave control mode. Typically, a mode of superimposing a third harmonic wave component in the case where k=1 to a sine wave corresponds to this control mode. In this way, the modulation factor can be increased to approximately 0.71. In this control mode, there is caused a period in which a voltage command is made higher than the amplitude of the carrier wave by the harmonic wave component, but the k-th harmonic wave component superimposed to the respective phases is cancelled between lines, so that the line voltage can keep a sine wave.

An overmodulated PWM control mode (hereinafter referred to as "overmodulated control mode") is a mode of performing the same PWM control as the sine wave control mode in a range in which an amplitude of the sine wave component of the voltage command is larger than the amplitude of the carrier wave. In particular, the fundamental wave component can be further increased by "a voltage amplitude correction" of deforming the voltage command from its original sine waveform and the modulation factor can be further increased to a range of approximately 0.78 from a maximum modulation factor in the sine wave control mode. In the overmodulated control mode, the amplitude of the sine wave component of the voltage command is larger than the amplitude of the carrier wave, so that the line voltage to be impressed on the AC motor 2 becomes not a sine wave but a voltage having a deformed waveform.

In the sine wave control mode and the overmodulated control mode is performed "a current feedback control" for controlling the amplitude and the phase of an AC voltage to be impressed on the AC motor 2 by the feedback of an output current.

On the other hand, in a square wave control mode, one pulse of a square wave in which a ratio of a high level voltage period to a low level voltage period is 1:1 in one period of the current is impressed on the AC motor 2. In this way, the modulation factor can be increased to approximately 0.78. In the square wave control mode, the amplitude of the voltage to be impressed to the AC motor 2 is fixed, so that "a torque feedback control" is performed by a phase control of a square wave voltage pulse based on the deviation between a torque estimated value and a torque command value.

The electric motor control device 10 according to the first embodiment is characterized in that the current estimation of another phase different from a sensor phase is performed by a current sensed value of one current sensor 13 at an arbitrary timing. Here, a method for estimating a current in the torque feedback control mode will be described on the basis of FIG. 4 to FIG. 11. In this regard, "the control device of the AC motor" of the present disclosure can be applied to the current estimation not only in the torque feedback control mode but also in the current feedback control mode described above.

First, the general construction of the control section 15 included by the electric motor control device 10 and an operation of the torque feedback control mode will be described.

Figure 4:
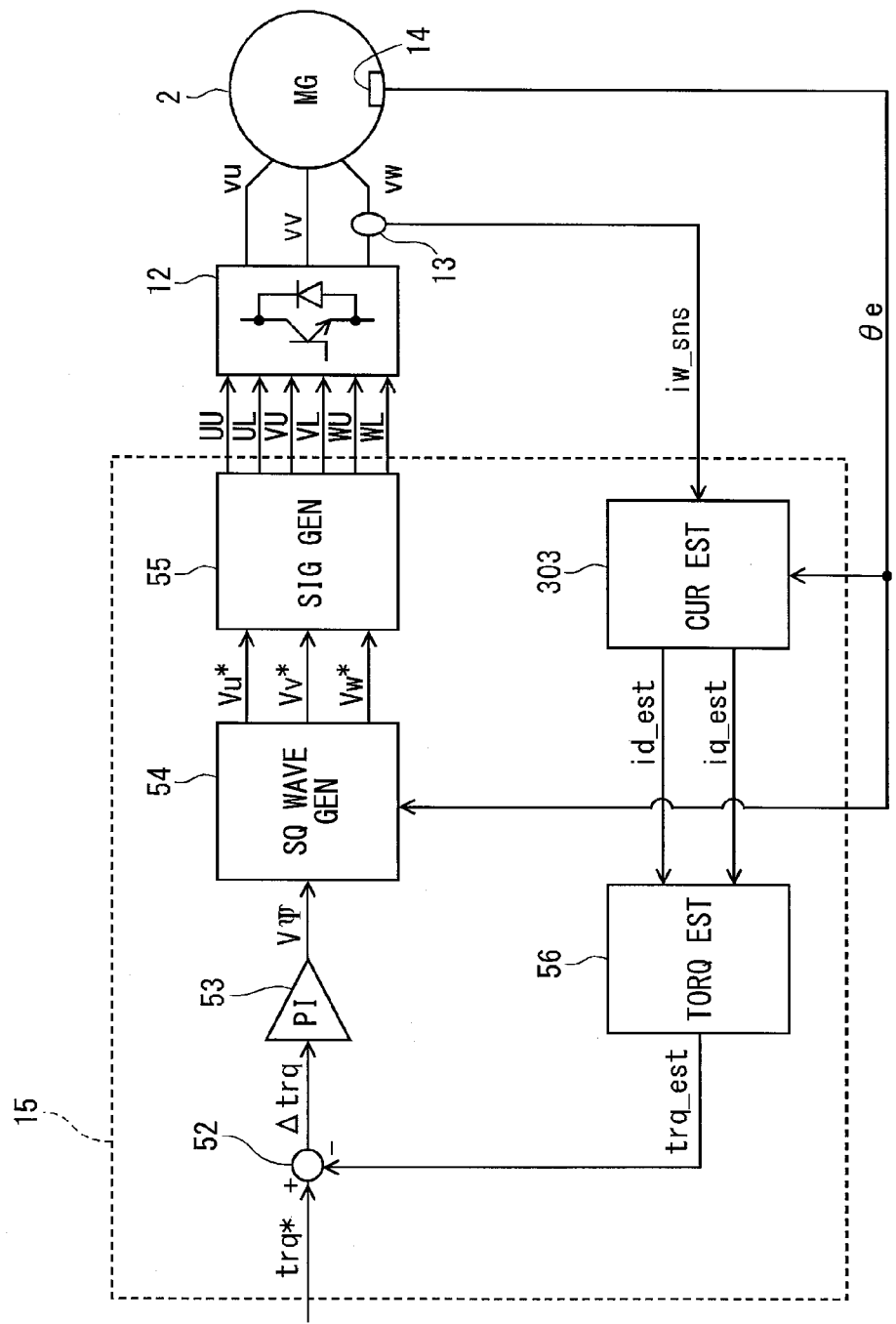
FIG. 4 is a block diagram to show a construction of a control section of the control device of the AC motor according to the embodiment of the present disclosure.

As shown in FIG. 4, the control section 15 includes a torque subtractor 52, a PI operation part 53, a square wave generator 54, a signal generator 55, a current estimation part 303, and a torque estimation part 56.

The torque subtractor 52 calculates a torque deviation Δtrq of a difference between a torque estimated value trq_est, which is fed back from the torque estimation part 56, and a torque command value trq*.

The PI operation part 53 calculates "a voltage phase command value $V_\psi$," which is a phase command value of a voltage vector, in such a way as to converge the torque deviation Δtrq to 0 by a PI operation in order to make the torque estimated value trq_est follow the torque command value trq*.

The square wave generator 54 generates a square wave on the basis of the voltage phase command value $V_\psi$ and the electric angle θe and outputs a U phase voltage command value vu*, a V phase voltage command value w*, and a W phase voltage command value vw*.

The signal generator 55 generates voltage command signals UU, UL, VU, VL, WU, WL, which relate to switching on/off the switching elements of the inverter 12, on the basis of the U phase voltage command value vu*, the V phase voltage command value w*, and the W phase voltage command value vw* and outputs the voltage command signals UU, UL, VU, VL, WU, WL to the inverter 12. Switching on/off the switching elements of the inverter 12 is controlled on the basis of the voltage command signals UU, UL, VU, VL, WU, WL, whereby three phase AC voltages vu, w, vw are generated. Then, the three phase AC voltages vu, w, vw are impressed on the AC motor 2, whereby the drive of the AC motor is controlled so as to output torque corresponding to the torque command value trq*.

Figure 5:
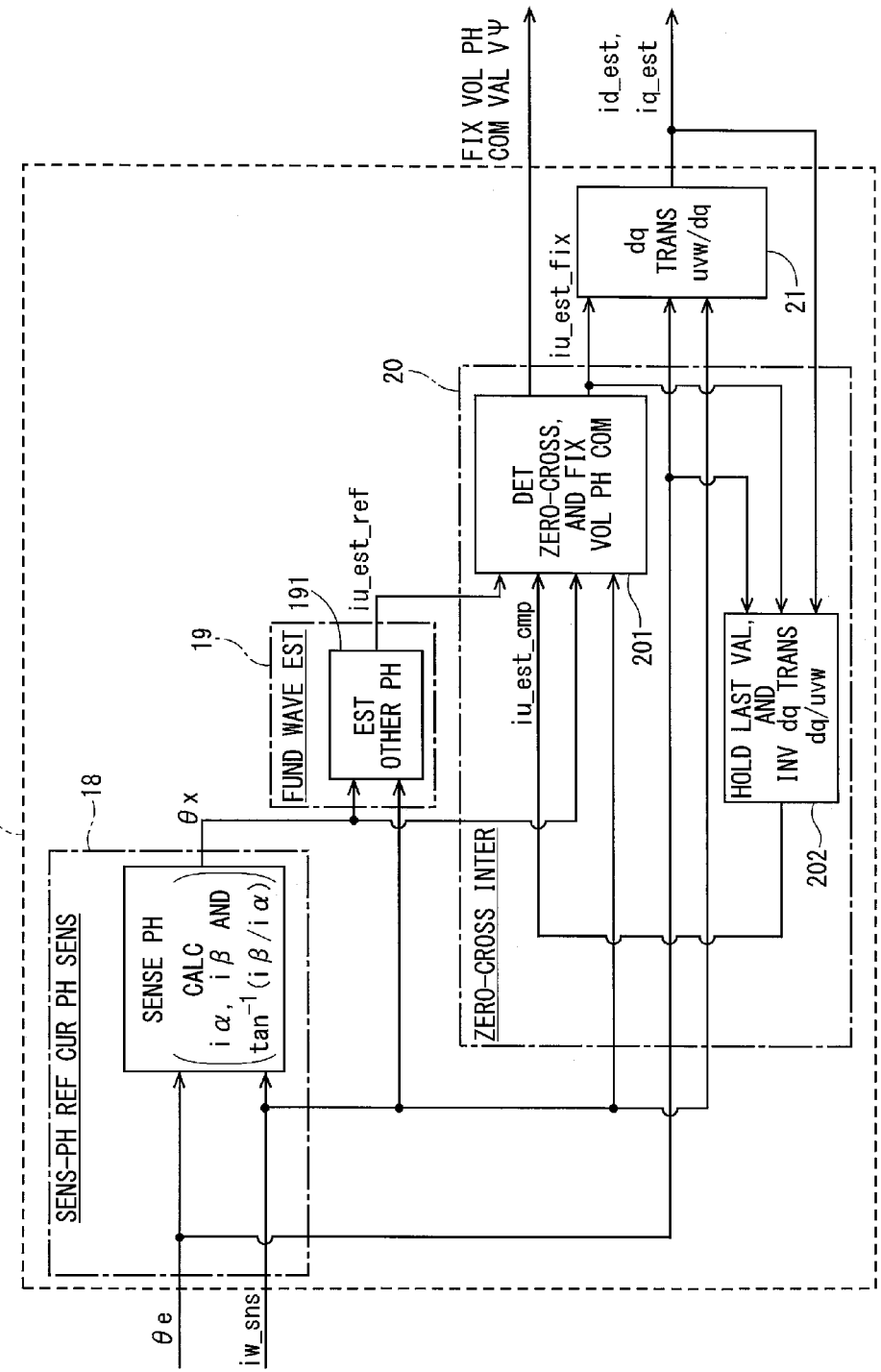
FIG. 5 is a block diagram to show a construction of a current estimation part of the control device of the AC motor according to the embodiment of the present disclosure.

The current estimation part 303 estimates a d axis current estimated value id_est and a q axis current estimated value iq_est on the basis of the current sensed value iw_sns of the sensor phase, which is sensed by the current sensor 13, and the electric angle θe, which is acquired from the rotation angle sensor 14. The current estimation part 303 corresponds to "a current estimation device." The current estimation part 303, as shown in FIG. 5, includes a sensor phase reference current phase sensing part 18, a fundamental wave estimation part 19, a zero-crossing interpolation part 20, and a dq transformation part 21.

The sensor phase reference current phase sensing part 18 calculates an α axis current iα and a β axis current iβ on the basis of the current sensed value iw_sns of the sensor phase, which is sensed by the current sensor 13, and the electric angle θe, which is acquired by the rotation angle sensor 14. Then, the sensor phase reference current phase sensing part 18 calculates a sensor phase reference current phase θx, which is defined in an α-β coordinate system, by the use of the α axis current iα and the β axis current iβ, which are calculated. The sensor phase reference current phase sensing part 18 corresponds to "a device for calculating an α axis current" and "a device for calculating a β axis current iβ." A method for calculating the α axis current iα, the β axis current iβ, and the sensor phase reference current phase θx will be later described in detail.

The fundamental wave estimation part 19 calculates a current estimated value iu_est of another phase (U phase) on the basis of the current sensed value iw_sns of the sensor phase, which is sensed by the current sensor 13, and the sensor phase reference current phase Ox, which is calculated. The calculated current sensed value iu_est is outputted as a current estimated value (reference value) iu_est_ref of an estimated phase to the zero-crossing interpolation part 20.

Here, when the current sensed value iw_sns of the sensor phase becomes 0 [A], or a tangent tan(θx) of the sensor phase reference current phase θx becomes infinite, "zero multiplication" of multiplying something by zero" is caused in a formula (3) which will be described later. Further, when the tangent tan(θx) of the sensor phase reference current phase θx becomes zero, "zero division" of dividing something by zero is caused in the formula (3). For this reason, the current estimated value iu_est of the U phase of the estimated phase might be greatly varied.

Hence, in the present embodiment, the zero-crossing interpolation part 20 interpolates the current estimated value (reference value) iu_est _ref to thereby mask the zero division and the zero multiplication. In this regard, as to the zero division, in order to prevent the current estimated value from being calculated to be an unintentional value by the effect of a discrete system in a formula (4) which will be described later, it is possible to take measures against the zero division also by setting a limited value for the estimated coefficient iu_kp or for a term of {1/tan(θx)} in the estimated coefficient iu_kp. Further, in the case where the control section 15 is mounted with the formula (4), it is also effective to map the estimated coefficient iu_kp or the term of {1/tan(θx)} of the estimated coefficient iu_kp. In this case, it is possible to take measures against "the zero division" also by setting a limited value in the map.

The zero-crossing interpolation part 20 includes a zero-crossing determination part 201 and a last value holding part 202. The zero-crossing determination part 201 determines whether or not a zero-crossing condition holds. In the present embodiment, when the current sensed value iw_sns of the sensor phase is within a specified range including 0 [A], the zero-crossing determination part 201 determines that the zero-crossing condition holds.

"The current sensed value iw_sns of the sensor phase is within a specified range including 0 [A]" means that an absolute value of the current sensed value iw_sns of the sensor phase is not more than a specified value or that an absolute value of the estimation coefficient iu_kp is not less than a specified value. Here, "a specified value" may be set by a current value of, for example, ±5 [A], or may be set on the basis of a resolution of, for example, 5 [LSB] in the discrete system, or may be set by a mathematical formula or the like. Further, the current sensed value iw_sns of the sensor phase is synchronous with the sensor phase reference current phase θx, so that the zero-crossing determination part 201 may determine whether or not a zero-crossing condition holds by the value of the sensor phase reference current phase θx.

In the case where the zero-crossing determination part 201 determines that the zero-crossing condition does not hold, the zero-crossing determination part 201 outputs the current estimated value (reference value) iu_est_ref calculated by the other phase estimation part 191 of the fundamental wave estimation part 19, as it is, as a current estimated value (fixed value) iu_est_fix to the dq transformation part 21.

On the other hand, in the case where the zero-crossing determination part 201 determines that the zero-crossing condition holds, the zero-crossing determination part 201 fixes the voltage phase command value $V_\psi$. In this case, the zero-crossing determination part 201 may forcibly reduce the torque deviation Δtrq (refer to FIG. 4) to 0 [Nm] or may directly fix the voltage phase command value $V_\psi$ by holding the voltage phase command value $V_\psi$ at a value of the last time. This can prevent variations in the voltage phase command value $V_\psi$ from being caused by the error of the current estimated value iu_est.

Further, the zero-crossing determination part 201 acquires a current estimated value (interpolated value) iu_est_cmp from the last value holding part 202 and outputs the current estimated value (interpolated value) iu_est_cmp as the current estimated value (fixed value) iu_est_fix to the dq transformation part 21.

The last value holding part 202 holds a value of the last time in advance, and in the case where the zero-crossing determination part 201 determines that the zero-crossing conditions holds, the last value holding part 202 calculates the current estimated value (interpolated value) iu_est_cmp and outputs the current estimated value (interpolated value) iu_est_cmp to the zero-crossing determination part 201.

For example, the last value holding part 202 holds a specified number of nearest previous current estimated values (fixed values) iu_est_fix, which are calculated previously, as current estimated values (held values) iu_est_hld. Then, in the case where the zero-crossing determination part 201 determines that the zero-crossing conditions holds, the last value holding part 202 outputs the current estimated value (held value) iu_est_hld, which is a value of the last time or a value before the last time, as the current estimated value (interpolated value) iu_est_cmp to the zero-crossing determination part 201.

The dq transformation part 21 calculates the d axis current estimated value id_est and the q axis current estimated value iq_est by the dq transformation by the use of the current estimated value (fixed value) iu_est_fix acquired from the zero-crossing interpolation part 20, the current sensed value iw_sns of the sensor phase, and the electric angle θe. In this regard, a zero-crossing method in the current estimation part 303 may be a method other than the method described in the embodiment or the zero-crossing interpolation may be not performed as required.

The torque estimation part 56 operates a torque estimated value trq_est by a map or a mathematical formula on the basis of the d axis current estimated value id_est and the q axis current estimated value iq_est, which are estimated by the current estimation part 303, and feeds back the torque estimated value trq_est to the torque subtractor 52.

Next, a method for estimating the current of the AC motor 2, which is performed by the current estimation part 303, will be described.

In general, the currents iu, iv, iw of the respective phases of the AC motor 2 have a phase difference of 120[°] between them and are changed according to the electric angle θe and the amplitude and the phase of the current vector. Here, in the case where the current estimated value iu_est of the other phase (U phase) is calculated on the basis of the current sensed value iw_sns of the sensor phase (W phase) of the AC motor 2, when the electric angle θx (which is a current phase based on the sensor phase and corresponds to an angle formed by the sensor phase and the current vector), which becomes 0[°] at 0 [A] when the current sensed value iw_sns of the sensor phase (W phase) crosses zero from minus to plus and which becomes 180[°] at 0 [A] when the current sensed value iw_sns of the sensor phase (W phase) crosses zero from plus to minus, is used, the current sensed value iw_sns of the sensor phase (W phase) and the current estimated value iu_est of the other phase (U phase) can be expressed by the following formulas (1), (2). Here, Ia is an amplitude of the current.

$$iw\_sns = Ia \times \sin(\theta x) \tag{1}$$

$$iu\_est = Ia \times \sin(\theta x - 120[°]) \tag{2}$$

The current estimated value iu_est of the formula (2) can be expressed by a formula (3) by the use of the current sensed value iw_sns of the sensor phase (W phase) of the formula (1), that is, the current phase based on the sensor phase.

[Mathematical formula 1]

$$\begin{aligned} iu\_est &= Ia \times \sin(\theta x - 120°) \\ &= -\frac{1}{2} \times Ia \times \sin(\theta x) - \frac{\sqrt{3}}{2} \times Ia \times \cos(\theta x) \\ &= -\frac{1}{2} \times iw\_sns - \frac{\sqrt{3}}{2} \times \frac{Ia \times \sin(\theta x)}{\tan(\theta x)} \\ &= \left\{-\frac{1}{2} - \frac{\sqrt{3}}{2} \times \frac{1}{\tan(\theta x)}\right\} \times iw\_sns \end{aligned} \tag{3}$$

Further, the current estimated value iu_est of the formula (2) can be expressed also by a formula (4) by the use of an estimated coefficient iu_kp corresponding to the sensor phase reference current phase θx.

[Mathematical formula 2]

$$iu\_est = iu\_kp \times iw\_sns \tag{4}$$

provided that $$iu\_kp = \left\{-\frac{1}{2} - \frac{\sqrt{3}}{2} \times \frac{1}{\tan(\theta x)}\right\}$$

Figure 6:
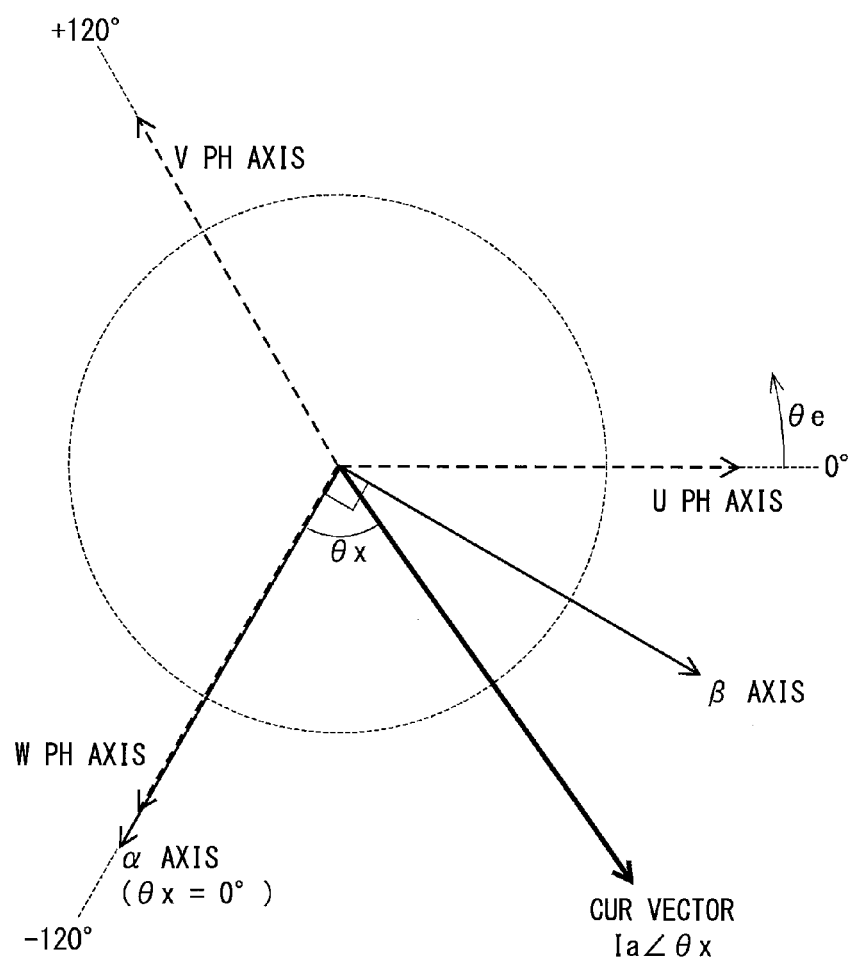
FIG. 6 is an illustration to illustrate a fixed coordinate system (α-β coordinate system) based on a sensor phase.

As shown in FIG. 6, when a fixed coordinate system (α-β coordinate system) is set by the use of an α axis in the same direction as the sensor phase axis (W phase axis) and a β axis in a direction orthogonal to the sensor phase axis (W phase axis), the sensor phase reference current phase θx (current phase based on the sensor phase) can be found by a formula (5) by the use of an α axis current iα and a β axis current iβ in the fixed coordinate system (α-β coordinate system) based on the sensor phase (W phase).

$$\theta x = \tan^{-1}(i\beta/i\alpha) \qquad (5)$$

Here, in the case where the θx is calculated by $\tan^{-1}$, there is a case where the sensor phase reference current phase θx does not become an angle synchronous with the sensor phase (W phase), depending on the definition of the α axis current iα and the β axis current iβ. However, this is because of the definition of the axis, for example, an interchange or a sign inversion between the α axis and the β axis, so that the interchange or the sign inversion between the α axis current iα and the β axis current iβ may be made in such a way that θx=0[°] at 0 [A] when the current sensed value iw_sns crosses zero from minus to plus and that θx=180[°] at 0 [A] when the current sensed value iw_sns crosses zero from plus to minus and then the sensor phase reference current phase θx may be calculated or a phase difference of ±90[°], which is caused by an orthogonal relationship between the α axis and the β axis, may be directly added to or subtracted from the sensor phase reference current phase θx.

The α axis current iα can be expressed by a formula (6) by the use of the currents iu, iv, iw of the respective phases. Here, K is a transformation coefficient.

$$i\alpha = K \times \{iw - (\tfrac{1}{2}) \times iu - (\tfrac{1}{2}) \times iv\} \qquad (6)$$

The formula (6) can be transformed into a formula (7) on the basis of the Kirchhoff's law that iu+iv+iw=0.

$$i\alpha = K \times (3/2) \times iw \qquad (7)$$

When the current sensed value iw_sns of the sensor phase (W phase) is used as the W phase current iw, the following formula (8) can be obtained.

$$i\alpha = K \times (3/2) \times iw\_sns \qquad (8)$$

On the other hand, as to the β axis current iβ, paying attention to the fact that the phase difference between the α axis current iα and the β axis current iβ is 90[°], that is, the α axis current iα and the β axis current iβ are in the same relationship between a sine wave and a cosine wave, the β axis current iβ is calculated on the basis of a differential value Δiα of the α axis current iα. Hereinafter, a method for calculating a β axis current iβ will be described.

First, selecting a timing when the current of the sensor phase and the electric angle are sensed will be described on the basis of a voltage waveform of each phase in a square wave control mode.

Figure 7:
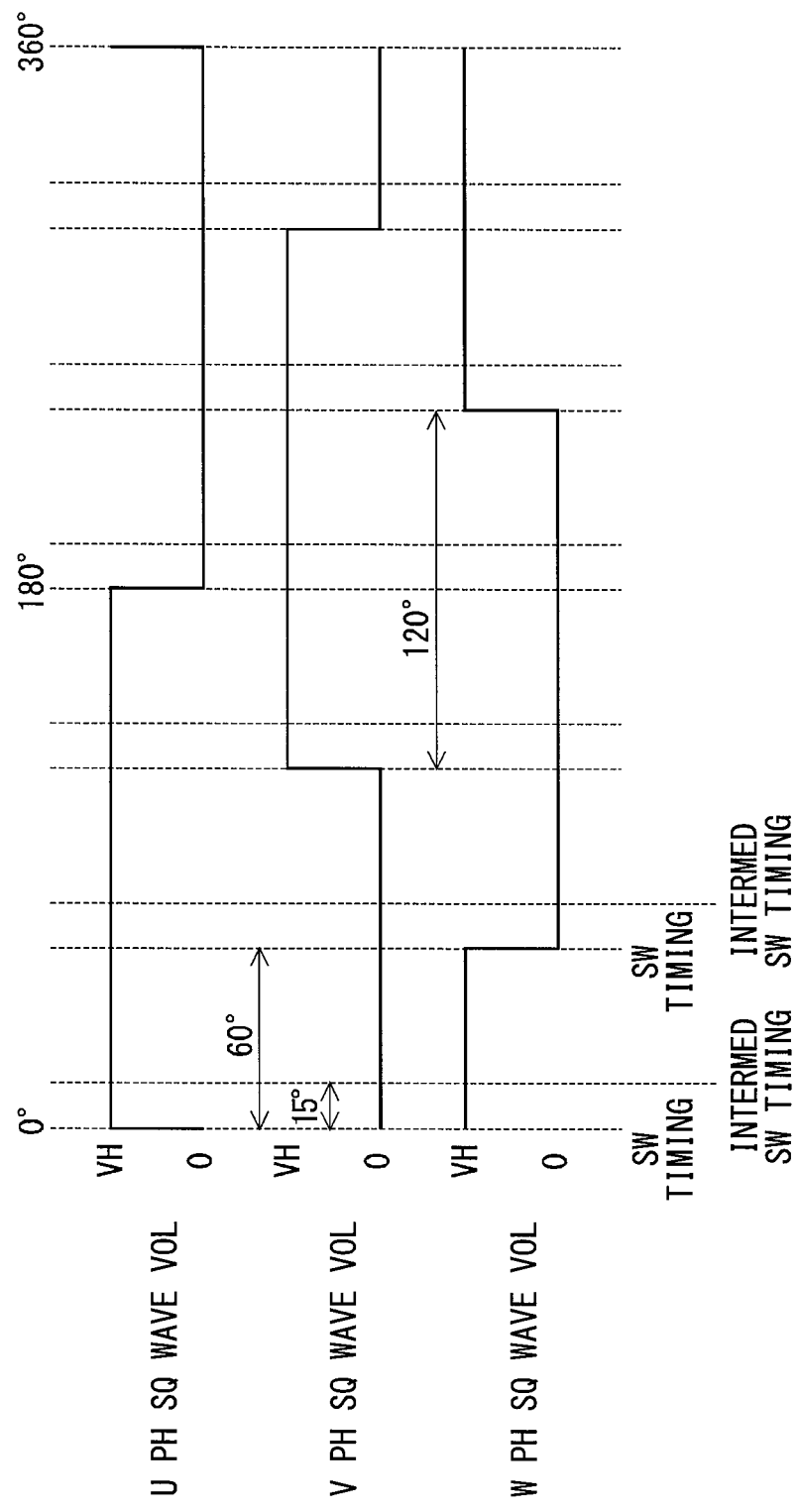
FIG. 7 is a chart to illustrate a switch timing and an intermediate timing in a square wave control mode.

As shown in FIG. 7, the voltage waveform of each phase in the square wave control mode is a waveform in which 0 [V] at which the switching element is off and a system voltage VH at which the switching element is on are interchanged every 180[°]. The phases of the voltage waveforms of three phases are shifted from each other by 120[°], and when the switching element of any one phase of the inverter 12 is switched on/off every electric angle of 60[°], the voltage waveform is switched on/off. A timing when the switching element is switched on/off is referred to as "a switch timing". A difference in the electric angle between the consecutive switch timings is 60[°].

In the present embodiment, the sensing of the current of the sensor phase by the current sensor 13 and the sensing of the electric angle θe by the rotation angle sensor 14 are performed at each switch timing described above and at each intermediate timing which is a timing between the consecutive switch timings and which is a timing "set at unequal intervals" to the consecutive switch timings.

Here, the intermediate timing, which is a timing between the consecutive switch timings and which is a timing "set at unequal intervals" to the consecutive switch timings, is defined in the following manner.

In the case where one timing when the current and the electric angle are sensed exists between the consecutive switch timings, the intermediate timing, which is a timing between the consecutive switch timings and which is a timing "set at unequal intervals" to the consecutive switch timings, is the one timing, which is set in such a way that an electric angle movement amount between a switch timing just before the one timing and the one timing is different from an electric angle movement amount between a switch timing just after the one timing and the one timing.

Specifically, in the case where an electric angle movement amount between the consecutive switch timings is 60[°], as is the case with the present embodiment, for example, 8[°] and 25.5[°] are given as specific examples of an electric angle movement amount for an intermediate timing. In the case where one timing when a current and an electric angle are sensed exists between consecutive switch timings and where an electric angle movement amount between the one timing and a switch timing just before the one timing is 25.5[°], the electric angle movement amount between the one timing and the switch timing just before the one timing is 25.5[°], whereas an electric angle movement amount between the one timing and a switch timing just after the one timing is 34.5[°], so that the one timing can be said to be an intermediate timing which is "set at unequal intervals" to the consecutive switch timings.

Moreover, in the case where M (not less than 2) timings when a current and an electric angle are sensed exist between consecutive switch timings, an intermediate timing which is a timing between the consecutive switch timings and which is a timing "set at unequal intervals" to the consecutive timings is each of the M timings, which are timings except for a case where, when the timings are numbered from 1 ⋯ m (2≤m≤M) ⋯ to M in the order of time from the timing just after a former switch timing of the consecutive switch timings, all of an electric angle movement amount between the former switch timing and a 1-st timing, an electric angle movement amount between the 1-th timing and a 2-nd timing, ⋯, an electric angle movement amount between an (m−1)-th timing and an m-th timing, an electric angle movement amount between the m-th timing and an (m+1)-th timing, ⋯ an electric angle movement amount between an (M−1)-th timing and an M-th timing, and an electric angle movement amount between the M-th timing and a latter switch timing of the consecutive switch timings are equal to each other.

Specifically, in the case where an electric angle movement amount between the consecutive switch timings is 60[°], as is the case with the present embodiment, it is assumed that two timings when the current and the electric angle are sensed are set between the consecutive switch timings in such a way that electric angle movement amounts between the two timings and a former switch timing of the consecutive switch timings are, for example, 8[°] and 16[°], respectively. In this case, as to the timing (hereinafter referred to as "a 1-st timing") set just after the former switch timing and having the electric angle movement amount of 8[°] the electric angle movement amount between the 1-st timing and the former switch timing is 8[°], whereas an electric angle movement amount between the timing (hereinafter referred to as "a 2-nd timing") just after the 1-st timing and having the electric angle movement amount of 16[°] is 8[°], which is the same as the electric angle movement between the 1-st timing and the former switch timing. However, an electric angle movement amount between the 2-nd timing and a latter switch timing of the consecutive switch timings is 44[°], which is different from 8[°] of the electric angle movement amount between the 2-nd timing and the 1-st timing. In this case, the 1-st timing and the 2-nd timing can be said to be intermediate timings which are timings "set at unequal intervals" to the consecutive switch timings.

Hereinafter, the switch timing means the timing which is the timing between the consecutive switch timings and which is the timing "set at unequal intervals" to the consecutive switch timings.

In the present embodiment, as shown in FIG. 7, as a typical example will be described a case where an electric angle movement amount between consecutive switch timings is 60[°] and where one intermediate timing is set between the consecutive switch timings in such a way that an electric angle movement amount between the one intermediate timing and the switch timing just before the intermediate timing becomes 15[°]. In this case, an electric angle movement between the intermediate timing and the switch timing just before the intermediate timing is 15[°], whereas an electric angle movement between the intermediate timing and the switch timing just after the intermediate timing is 45[°], that is, the intermediate timing is set at unequal intervals to the consecutive switch timings. Further, in this typical example, the switch timing and the intermediate timing alternately occur as sampling timings when the current of the sensor phase and the electric angle are sensed.

A differential value $\Delta i\alpha$ of the $\alpha$ axis current $i\alpha$ is calculated by a formula (9) on the basis of an amount of change in an electric angle movement amount $\Delta\theta e$ [rad] of the $\alpha$ axis current $i\alpha$, that is, a difference between a value of this time and a value of the last time but one of the $\alpha$ axis current $i\alpha$. In this regard, on the basis of a timing when a $\beta$ axis current $i\beta$ is calculated, a set of an electric angle at a sampling timing of this time and a value of the $\alpha$ axis current $i\alpha$ calculated on the basis of a current sensed value of a sensor phase at the sampling timing of this time is referred to as "a value of this time". Further, a set of an electric angle at a sampling timing of the last time and a value of the $\alpha$ axis current $i\alpha$ calculated at the sampling timing of the last time is referred to as "a value of the last time". Still further, a set of an electric angle at a sampling timing of the last time but one and a value of the $\alpha$ axis current $i\alpha$ calculated at the sampling timing of the last time but one is referred to as "a value of the last time but one".

$$\Delta i\alpha = -\{i\alpha(n)-i\alpha(n-2)\}/\Delta\theta e \quad (9)$$

Here, the electric angle movement amount $\Delta\theta e$ is a value obtained by converting an electric angle, which corresponds to an interval between a switch timing of this time and a switch timing of the last time or to an interval between an intermediate timing of this time and an intermediate timing of the last time, into radian. Further, $i\alpha$ (n) is a value of this time of the $\alpha$ axis current $i\alpha$ and $i\alpha$ (n−2) is a value of the last time but one of the $\alpha$ axis current $i\alpha$. In the present embodiment, when the $\alpha$ axis current $i\alpha(n)$ is assumed to be an $\alpha$ axis current $i\alpha$ calculated at an arbitrary switch timing, the $\alpha$ axis current $i\alpha(n-2)$ becomes an $\alpha$ axis current $i\alpha$ calculated at the switch timing of the last time of the arbitrary switch timing, that is, at a sampling timing of the last time but one. Still further, when the $\alpha$ axis current $i\alpha(n)$ is assumed to be an $\alpha$ axis current $i\alpha$ calculated at an arbitrary intermediate timing, the $\alpha$ axis current $i\alpha(n-2)$ becomes an $\alpha$ axis current $i\alpha$ calculated at the intermediate timing of the last time of the arbitrary intermediate timing, that is, at a sampling timing of the last time but one.

In this way, the differential value $\Delta i\alpha$ of the $\alpha$ axis current $i\alpha$ is calculated by the use of the current of the sensor phase and the electric angle between the switch timings or between the intermediate timings set at a specified interval of an electric angle movement amount, which is 15[°] to the switch timing just before the intermediate timing in the present embodiment, so that the effect of disturbance on a current waveform becomes the same level, which will be later described in detail, and hence the accuracy of calculation of the differential value $\Delta i\alpha$ of the $\alpha$ axis current $i\alpha$ can be improved. In this regard, depending on the definition of the $\alpha$ axis current $i\alpha$ and the $\beta$ axis current $i\beta$, it can be also thought that the sign is reversed, so that the sign may be operated as required so as to acquire a sine wave and a cosine wave necessary for calculating $\tan^{-1}$.

Further, the electric angle movement amount $\Delta\theta e$ may be a value obtained by converting an electric angle, which corresponds to an interval between a switch timing of this time and a switch timing of any one past time or to an interval between an intermediate timing of this time and an intermediate timing of any one past time, into radian. In the case where the electric angle movement amount $\Delta\theta e$ is a value obtained by converting an electric angle, which corresponds to an interval between a switch timing of this time and a switch timing of any one past time, into radian, the differential value $\Delta i\alpha$ of the $\alpha$ axis current $i\alpha$ is calculated by the formula (9) by the use of the $\alpha$ axis current $i\alpha$, which is calculated at the switch timing of this time, and the $\alpha$ axis current $i\alpha$, which is calculated at the switch timing of any one past time. Still further, in the case where the electric angle movement amount $\Delta\theta e$ is a value obtained by converting an electric angle, which corresponds to an interval between an intermediate timing of this time and an intermediate timing of any one past time, into radian, the differential value $\Delta i\alpha$ of the $\alpha$ axis current $i\alpha$ is calculated by the formula (9) by the use of the $\alpha$ axis current $i\alpha$, which is calculated at the intermediate timing of this time, and the $\alpha$ axis current $i\alpha$, which is calculated at the intermediate timing of any one past time.

Further, in the case where M (not less than 2) intermediate timings exist between the consecutive switch timings, the electric angle movement amount $\Delta\theta e$ is a value obtained by converting an electric angle, which corresponds to an interval between a past intermediate timing of going back by a phase corresponding to an interval between the consecutive switch timings with respect to an L-th ($1 \le L \le M$) intermediate timing and the L-th intermediate timing, into radian. In the case where the electric angle movement amount $\Delta\theta e$ is a value obtained by converting an electric angle, which corresponds to an interval between an intermediate timing of a past time going back by a phase corresponding to an interval between the switch timings with respect to the L-th intermediate timing and the L-th intermediate timing, into radian, the differential value $\Delta i\alpha$ of the $\alpha$ axis current $i\alpha$ is calculated by the formula (9) by the use of the $\alpha$ axis current $i\alpha$, which is calculated at the L-th intermediate timing, and the $\alpha$ axis current $i\alpha$, which is calculated at the intermediate timing of the past time.

Specifically, in the case where the switch timings are set at electric angles of 0, 60, 120[°] and where the intermediate timings are set at electric angles of 8, 16, 68, 76[°], the differential value $\Delta i\alpha$ of the $\alpha$ axis current $i\alpha$ is calculated by the formula (9) by the use of: the $\alpha$ axis current $i\alpha$ at the intermediate timing of the electric angle of 68[°]; the $\alpha$ axis current $i\alpha$ at the intermediate timing of the electric angle of 8[°], which goes back by an electric angle of 60[°] corresponding to the interval between the consecutive switching timings with respect to the intermediate timing of the electric angle of 68[°]; and the electric angle movement amount Δθe=60[°]

Figure 8A:
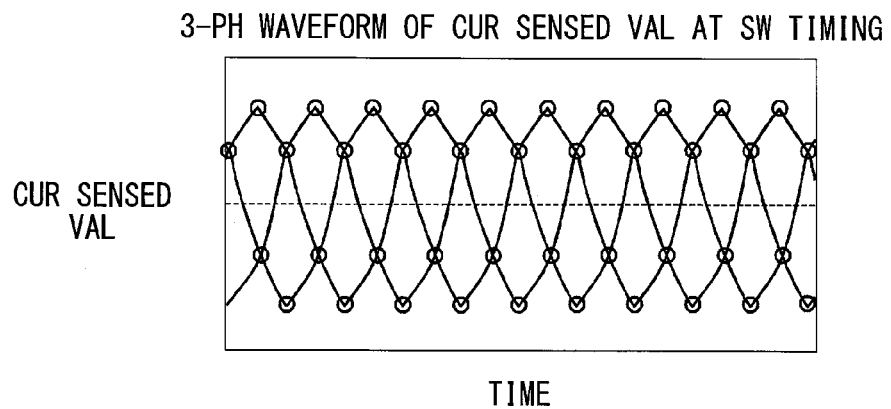
FIG. 8A is a graph to show a waveform of a current sensed value at a switch timing and FIG. 8B is a graph to show a waveform of a current sensed value at an intermediate timing.
Figure 8B:
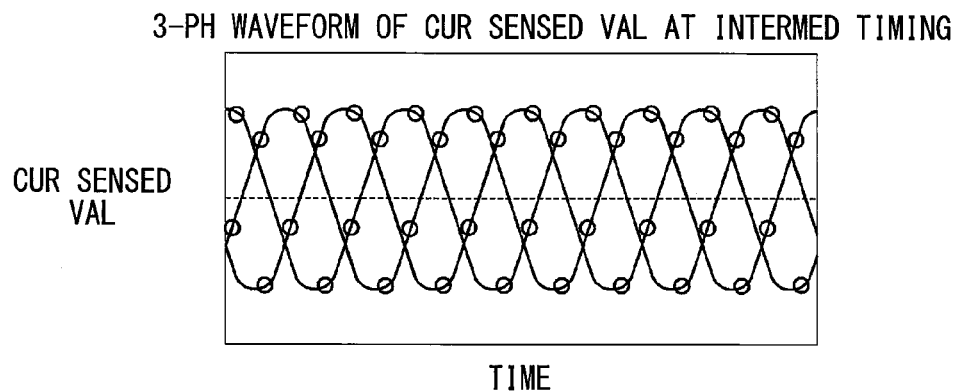

FIGS. 8A and 8B show three-phase waveforms calculated on the basis of a current sensed value sensed by the current sensor 13 at a switch timing and an intermediate timing. FIG. 8A shows a result of a current sensed value at a switch timing. FIG. 8B shows a result of a current sensed value at an intermediate timing. In FIG. 8A and FIG. 8B, timings when the current sensor 13 senses the current of the W phase are shown by outlined circles.

As shown in FIG. 8A, the waveform of the current sensed value sensed at the switch timing is deformed by the effect of the switching elements being switched on/off. On the other hand, as shown in FIG. 8B, the waveform of the current sensed value sensed at the intermediate timing is not much affected by the switching elements being switched on/off and hence is hardly deformed. For this reason, a waveform formed by both of the current sensed value at the switch timing and the current sensed value at the intermediate timing tends not to increase and decrease regularly like a sine wave but to increase and decrease irregularly.

Hence, the α axis current iα is calculated on the basis of the current sensed value iw_sns of the sensor phase at each of both sampling timings of the switch timing and the intermediate timing. The differential value Δiα of the α axis current iα is calculated on the basis of an amount of change in the electric angle movement amount Δθe of the calculated α axis current iα, that is, a difference between a value of this time and a value of the last time but one of the α axis current iα.

Further, in the case where the β axis current iβ is calculated on the basis of the differential value Δiα of the α axis current iα, the accuracy of calculation of the β axis current iβ is reduced by the effect of the current sensed value increasing or decreasing irregularly between the switch timing and the intermediate timing, which hence might reduce the accuracy of calculation of the sensor phase reference current phase θx based on the α axis current iα and the β axis current iβ.

As a countermeasure for the reduction in the accuracy of calculation of the sensor phase reference current phase θx, the control section 15 of the electric motor control device 10 according to the present embodiment calculates the α axis current iα on the basis of current sensed value iw_sns of the sensor phase at each of both sampling timings of the switch timing and the intermediate timing.

Further, as to the calculation of the β axis current iβ, the differential value Δiα of the α axis current iα is calculated on the basis of an amount of change in the α axis current iα between two switch timings at each switch timing, that is, an amount of change in the α axis current iα between the switch timing of the last time but one and the switch timing of this time, and then the β axis current iβ is calculated on the basis of the differential value Δiα of the α axis current iα. Further, as to the β axis current iβ, the differential value Δiα of the α axis current iα is calculated on the basis of an amount of change in the α axis current iα between two intermediate timings at each intermediate timing, that is, an amount of change in the α axis current iα between the intermediate timing of the last time but one and the intermediate timing of this time, and then the β axis current iβ is calculated on the basis of the differential value Δiα of the α axis current iα. In this way, as shown in FIGS. 8A and 8B, the β axis current iβ can be calculated with high accuracy with being little affected by the current sensed value increasing or decreasing irregularly between the switch timing and the intermediate timing, which hence can improve the accuracy of calculation of the sensor phase reference current phase θx based on the α axis current iα and the β axis current iβ.

Figure 9:
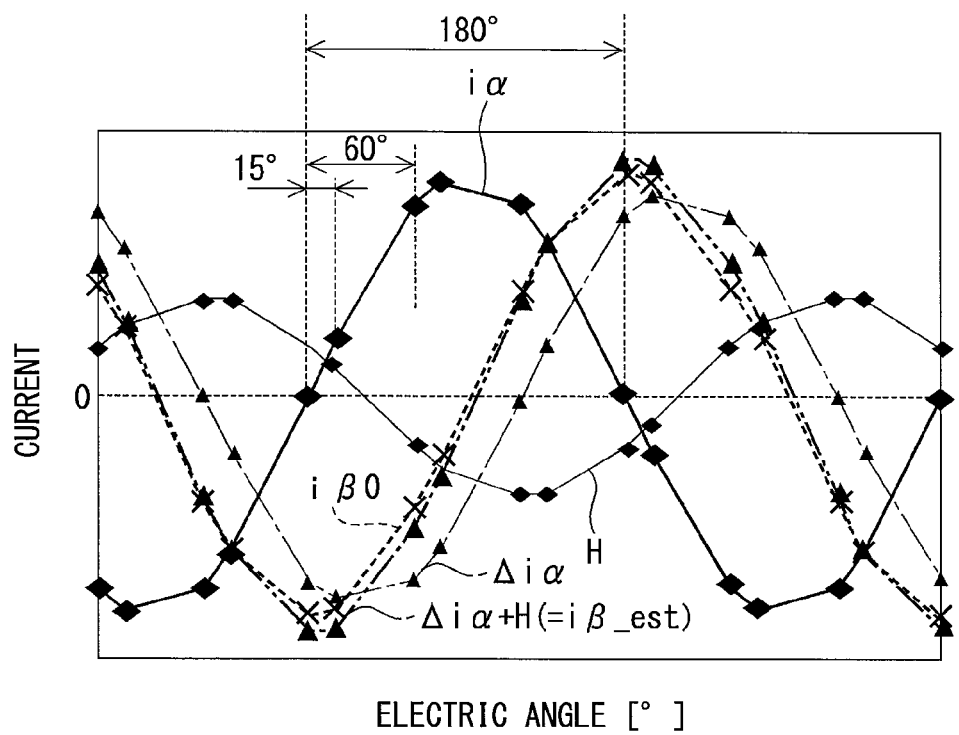
FIG. 9 is a graph to illustrate a correction when a β axis current iβ is calculated on the basis of a differential value Δiα of an α axis current.

Subsequently, a correction when the β axis current iβ is calculated on the basis the differential value Δiα of the α axis current iα will be described on the basis of FIG. 9. In FIG. 9, a horizontal axis designates an electric angle and it is shown that a current is sensed at an electric angle of a sampling timing shown by a black diamond mark on a waveform.

When it is assumed that the α axis current iα and the β axis current iβ are ideal sine waves, an actual β axis current iβ0 is an differential waveform of the α axis current iα and is defined as "an amount of change in the α axis current iα in an infinitesimal electric angle movement amount". However, a differential value Δiα of the α axis current iα in the actual electric motor control device 10 is a difference value between the α axis currents iα in a finite electric angle movement amount Δθe. Hence, the waveform of the differential value Δiα of the α axis current iα is delayed by a half of the electric angle movement amount (Δθe/2) with respect to the waveform of the actual β axis current iβ0.

Hence, when a β axis current estimated value iβ_est is calculated on the basis of the differential value Δiα of the α axis current iα, it is preferable that a correction amount H corresponding to (Δθe/2) is calculated from a formula (10) and that the correction amount H is added to the differential value Δiα of the α axis current iα by the use of a formula (11)

$$H=\{i\alpha(n)+i\alpha(n-2)\}/2\times(\Delta\theta e/2) \quad (10)$$

$$i\beta\_est=\Delta i\alpha+H \quad (11)$$

As shown by the formula (10), the correction amount H is calculated as a value obtained by multiplying "an average value of the value iα(n−2) of the last time but one and the value iα(n) of this time of the α axis current iα" by a half of the electric angle movement amount (Δθe/2). As shown in FIG. 9, the β axis current estimated value iβ_est calculated by the formulas (10), (11) well corresponds to the waveform of the actual β axis current iβ0.

Here, as to "the value iα(n−2) of the last time but one and the value iα(n) of this time of the α axis current iα and the corresponding electric angle movement amount Δθe", as is the case where the differential value Δiα of the α axis current iα is calculated, it is preferable that: "the α axis current iα at the switch timing of the last time but one and the switch timing of this time and the electric angle movement amount Δθe between the switch timings" are employed for the switch timing to thereby calculate the correction amount H; and "the α axis current iα at the intermediate timing of the last time but one and the intermediate timing of this time and the electric angle movement amount Δθe between the intermediate timings" are employed for the intermediate timing to thereby calculate the correction amount H.

In this way, the β axis current iβ can be calculated with high accuracy by the use of the correction amount H corresponding to the half of the electric angle movement amount (Δθe/2) on the basis of the differential value Δiα of the α axis current iα. In this regard, the method of calculating the β axis current iβ, described in the present embodiment, is one example, and a method of calculating a β axis current iβ is not limited to the method described in the present embodiment but the method described in the present embodiment may be modified as required, if the method can calculate the β axis current iβ with high accuracy.

In the control section 15 of the electric motor control device 10 according to the present embodiment, in the case where the current of the AC motor 2 is estimated, the sensor phase reference current phase sensing part 18 of the current estimation part 303 calculates the α axis current iα by the formula (8) by the use of the current sensed value iw_sns of the sensor phase (W phase) sensed by the current sensor 13 at each switch timing and at each intermediate timing. Then, the sensor phase reference current phase sensing part 18 calculates the differential value Δiα of the α axis current iα on the basis of the amount of change in the α axis current iα between two switch timings at each switch timing and then calculates the β axis current iβ by the use of the differential value Δiα of the α axis current iα and the correction amount H corresponding to a phase delay of (Δθe/2). Further, the sensor phase reference current phase sensing part 18 calculates the differential value Δiα of the α axis current iα on the basis of the amount of change in the α axis current iα between two intermediate timings at each intermediate timing and then calculates the β axis current iβ by the use of the differential value Δiα of the α axis current iα and the correction amount H corresponding to a phase delay of (Δθe/2). Then, the sensor phase reference current phase sensing part 18 calculates the sensor phase reference current phase θx by the formula (5) by the use of the α axis current iα and the β axis current iβ which are calculated in the manner described above.

Then, the fundamental wave estimation part 19 calculates the estimation coefficient iu_kp corresponding to the sensor phase reference current phase θx by the formula described in a "where clause" of the formula (4) or a map or the like and calculates a current estimated value iu_est of another phase (U phase) by the formula (4) by the use of the estimation coefficient iu_kp and the current sensed value iw_sns of the sensor phase (W phase). Further, the fundamental wave estimation part 19 may calculate the current estimated value iu_est of the other phase (U phase) by the formula (2) by the use of the sensor phase reference current phase Ox and the current sensed value iw_sns of the sensor phase (W phase).

Generally, when a processing unit such as a control ECU (microcomputer) is mounted with an operation formula, an operation is processed not in a continuous time but in a discrete time and a sensed value and an operated value are treated as discrete values based on a specified resolution (LSB). Hence, in the case where the zero division is caused in the formula (3), so as to prevent an estimated value from being calculated as an unintentional value by the effect of the discrete system, it is desired that a limited value is set for the estimation coefficient iu_kp or a term of 1/tan(θx) in the estimation coefficient iu_kp. Further, in the case where the processing unit is mounted with the formula (3), so as to prevent a multiplication operation and a division operation requiring a high processing load, it is effective to map the estimation coefficient iu_kp or the term 1/tan(θ) in the estimation coefficient iu_kp by using an argument of θx. In this case, it is desirable that a limited value is set on the map. These countermeasures makes it easy to apply the processing unit (microcomputer) to the discrete system and can reduce the processing load of the microcomputer to a minimum and can eliminate the need for purposely replacing the processing unit by an expensive microcomputer of high processing capacity.

Figure 10:
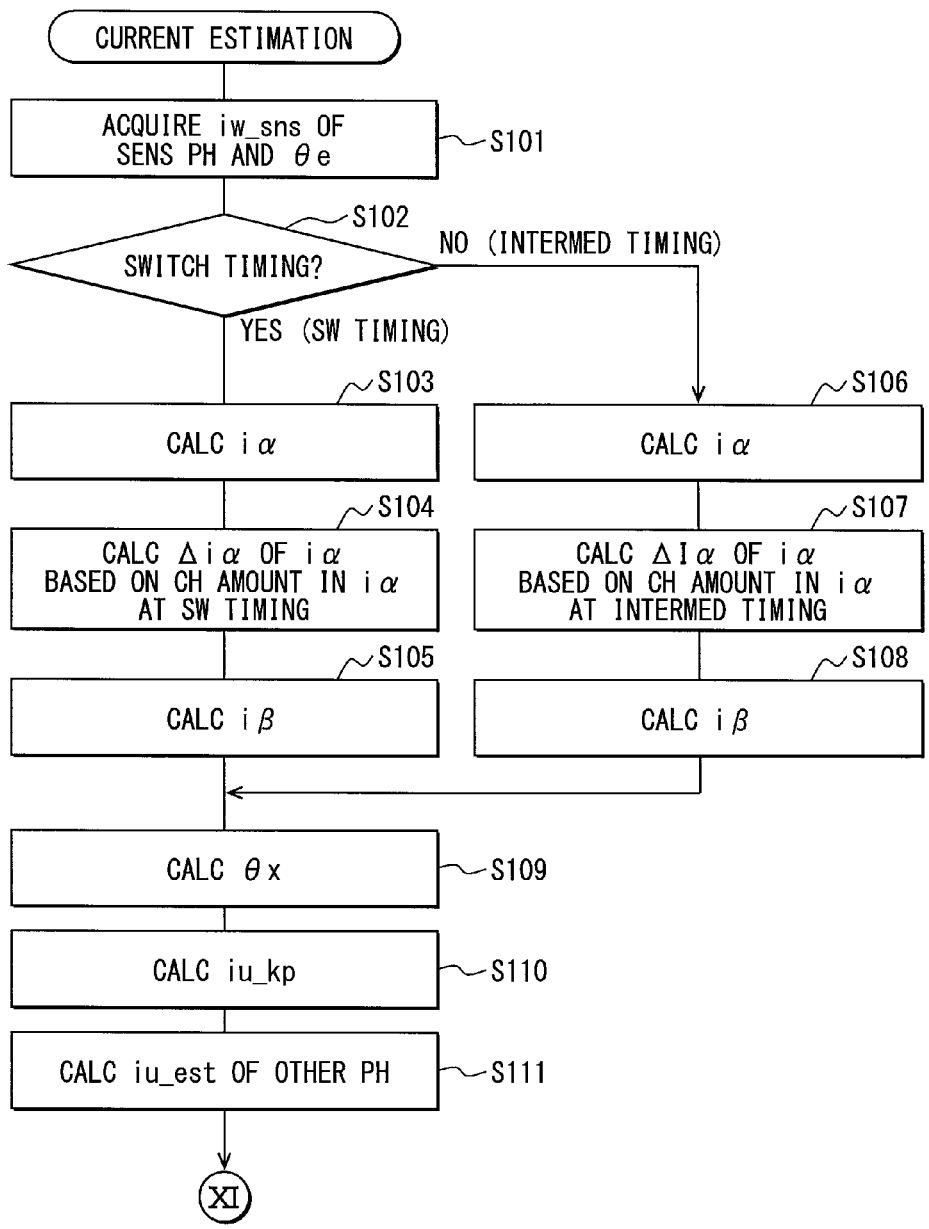
FIG. 10 is a main flow chart of a current estimation processing according to the embodiment of the present disclosure.
Figure 11:
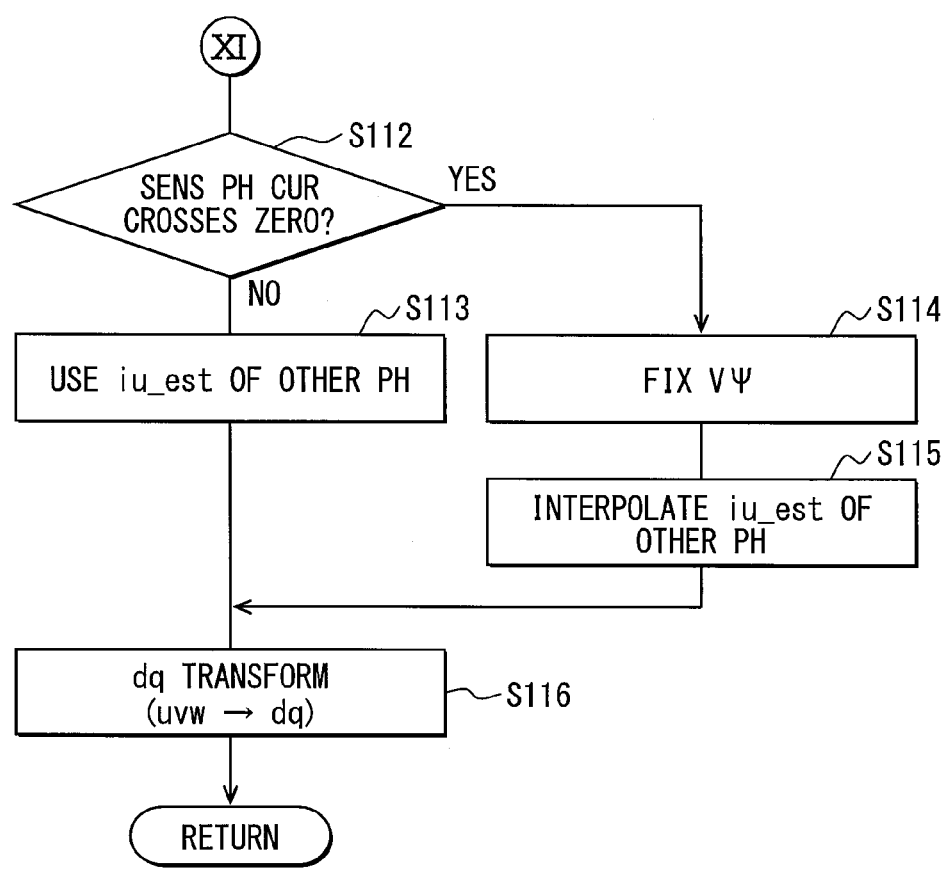
FIG. 11 is a subordinate flow chart of the current estimation processing of FIG. 10.

The current estimation in the current estimation part 303 described above is performed by a current estimation routine shown in FIG. 10 and FIG. 11. Hereinafter, the processing contents of the current estimation routine will be described.

The current estimation routine is repeatedly performed at a specified operation period during a period in which an electric power source is on. When the present routine is started, in a first step (hereinafter, designated by "S") 101 are read the current sensed value iw_sns of the sensor phase (W phase) sensed by the current sensor 13 and the electric angle θe found from the rotor rotational position of the AC motor 2 sensed by the rotation angle sensor 14.

Next, it is determined in S102 whether or not the present electric angle θe is the switch timing. In the case where it is determined that the present electric angle θe is the switch timing, the routine proceeds to S103, where the α axis current iα is calculated by the formula (8) by the use of the current sensed value iw_sns of the sensor phase (W phase) sensed at the switch timing.

Next to S103, the routine proceeds to S104, where the differential value Δiα of the α axis current iα is calculated on the basis of an amount of change in the α axis current iα between two switch timings, that is, a difference between a value of this time and a value of the last time but one of the α axis current iα on the basis of the current sensed value iw_sns at the switch timing.

Next, in S105, the differential value Δiα of the α axis current iα is corrected in the manner of the formula (11) by the use of the correction amount H shown by the formula (10) to thereby find the β axis current estimated value iβ_est corresponding to the β axis current iβ.

On the other hand, in the case it is determined in S102 that the present electric angle θe is not the switch timing, it is determined that the present electric angle θe is the intermediate timing and the routine proceeds to S106. In S106, the α axis current iα is calculated by the formula (12) by the use of the current sensed value iw_sns of the sensor phase (W phase) sensed at the intermediate timing.

Next to S106, the routine proceeds to S107, where the differential value Δiα of the α axis current iα is calculated on the basis of an amount of change in the α axis current iα between the intermediate timings, that is, a difference between a value of this time and a value of the last time but one of the α axis current iα calculated on the basis of the current sensed value iw_sns at the intermediate timing. Next, the routine proceeds to S108, where the differential value Δiα of the α axis current iα is corrected in the manner of the formula (11) by the use of the correction amount H shown by the formula (10) to thereby find the β axis current estimated value iβ_est corresponding to the β axis current iβ.

Next to S105 or S108, in S109, the sensor phase reference current phase θx is calculated by the formula (5) by the use of the α axis current iα and the β axis current iβ.

Next, in S110, the estimation coefficient iu_kp corresponding to the sensor phase reference current phase θx is calculated by a relationship formula or a map. Then, the routine proceeds to S111, where the current estimated value iu_est of the other phase (U phase) is calculated by the formula (4) by the use of the estimation coefficient iu_kp and the current sensed value iw_sns of the sensor phase (W phase).

Then, the routine proceeds to S112 shown in FIG. 11, where it is determined whether or not the present time is the timing when the sensor current crosses zero. Whether or not the present time is the timing when the sensor current crosses zero is determined by whether or not the current sensed value iw_sns of the sensor phase (W phase)=0 [A]. Whether or not the present time is the timing when the sensor current crosses zero may be determined by whether or not the current sensed value iw_sns of the sensor phase (W phase) is within a specified range including 0 [A], for example, by whether or not an absolute value of the current sensed value iw_sns of the sensor phase (W phase) is not more than a specified value, or by whether or not an absolute value of the estimation coefficient iu_kp is not less than a specified value. Further, the current sensed value iw_sns of the sensor phase is synchronous with the sensor phase reference current phase θx, so that whether or not the present time is the timing when the sensor current crosses zero may be determined by the value of the sensor phase reference current phase θx.

In the case where it is determined in this S112 that the present time is not the time when the sensor phase current crosses zero, the routine proceeds to step S113, where the current estimated value iu_est of the other phase (U phase), which is calculated in S111, is employed as it is. Further, in the case where it is determined in this S112 that the present time is the time when the sensor phase current crosses zero, the routine proceeds to step S114, where the voltage phase command value $V_\psi$ is fixed.

Next to S114, the routine proceeds to S115, where the current estimated value iu_est of the other phase (U phase) is interpolated. In this case, the current estimated value iu_est of the other phase (U phase) may be held directly at a value of the last time, thereby being interpolated. Alternatively, it is also recommended: to hold a d axis current estimated value id_est and a q axis current estimated value iq_est at their values of the last time; to perform an inverse dq transformation of calculating the current estimated value iu_est of the other phase (U phase) on the basis of the d axis current estimated value id_est and the q axis current estimated value iq_est, which are held at their values of the last time; and to interpolate the current estimated value iu_est of the other phase by the current estimated values obtained by the inverse dq transformation. Further, it is also recommended to interpolate the current estimated value iu_est of the other phase (U phase) by calculating the current estimated value iu_est of the other phase (U phase) by a different logic. Still further, a method of interpolating the current estimated value iu_est of the other phase may be changed as required.

After the current estimated value iu_est of the other phase (U phase) is set, in S113 and S115, as the current estimated value iu_est_fix of the other phase (U phase) used for the dq transformation, the routine proceeds to S116, where a dq transformation of calculating the d axis current estimated value id_est and the q axis current estimated value iq_est on the basis of the current sensed value iu_sns of the sensor phase (W phase) and the current estimated value iu_est_fix of the other phase (U phase) is performed.

(1) The electric motor control device 10 of the present embodiment senses the phase current of one phase among three phases by the current sensor 13 and estimates the phase currents of the other two phases. The current sensor 13 is provided only in the sensor phase, so that the number of the current sensor 13 can be reduced. In this way, a portion near a three-phase output terminal can be reduced in size and the cost of the electric motor control device 10 can be reduced.

Further, since the number of the current sensor 13 is reduced to one, the effect of a gain error of the current sensor, which can be caused in a control system of a conventional AC motor using a plurality of current sensors, can be eliminated. In this way, in the AC motor 2, an output torque variation caused by the gain error of the plurality of current sensors can be eliminated. Hence, for example, in the case of the AC motor 2 for a vehicle, this leads to eliminating vehicle vibrations in the vehicle and hence can eliminate an element of lowering the product marketability of the vehicle.

(2) Further, in the electric motor control device 10 according to the present embodiment, by paying attention to the fact that a phase difference between the α axis current iα and the β axis current iβ is 90[°], that is, the α axis current iα and the β axis current iβ are in the relationship between a sine wave and a cosine wave, the α axis current iα is calculated on the basis of current sensed value iw_sns of the sensor phase (W phase) and the β axis current iβ is calculated on the basis of the differential value (difference value) Δiα of the α axis current iα. In this way, the electric motor control device 10 according to the present embodiment can calculate the β axis current iβ without using the current command value of the other phase and hence can be applied to a mode of not using the current command value such as the d axis current command value, the q axis current command value, and the three-phase current command values at the time of controlling a current flowing through the AC motor 2.

(3) In the electric motor control device 10 according to the present embodiment, the sensor phase reference current phase θx is calculated on the basis of the α axis current iα and the β axis current iβ in the fixed coordinate system (α-β coordinate system) based on the sensor phase. In this way, an actual current phase θx based on the sensor phase can be calculated and the current estimated value iu_est of the other phase can be calculated on the basis of the sensor phase reference current phase θx and the current sensed value iw_sns of the sensor phase. Hence, the current estimated value iu_est of the other phase can be calculated with high accuracy by taking into consideration the harmonic component of the actual current phase θx and the effect of variations that can be usually caused, which hence can improve the accuracy of calculation of the current estimated value iu_est.

(4) In the electric motor control device 10 according to the present embodiment, a method of: "calculating the α axis current iα on the basis of the current sensed value iw_sns of the sensor phase at each of both sampling timings of the switch timing and the intermediate timing: and calculating the differential value Δiα of the α axis current iα by differentiating the α axis current iα between the switch timings at each switch timing and by differentiating the α axis current iα between the intermediate timings at each intermediate timing" is recommended as a preferable method of calculating the differential value Δiα of the α axis current iα in the torque feedback control mode.

As described above, the waveform of the current sensed value sensed at each switch timing is affected by the switching elements being switched on/off and hence is deformed, whereas the waveform of the current sensed value sensed at each intermediate timing is not much affected by the switching elements being switched on/off and hence is hardly deformed. For that reason, a current waveform formed of the current sensed value sensed at each switch timing and the current sensed value sensed at each intermediate timing tends not to increase and decrease regularly like a sine wave but to increase and decrease irregularly.

On the other hand, each of the waveform of the current sensed value sensed at each switch timing and the waveform of the current sensed value sensed at each intermediate timing increases and decreases nearly regularly. Hence, if the α axis current iα is differentiated between the switch timings or the intermediate timings, the β axis current iβ can be calculated with high accuracy with being little affected by the current sensed value increasing and decreasing irregularly between the switch timing and the intermediate timing. Further, the accuracy of calculation of the sensor phase reference current phase θx based on the α axis current iα and the β axis current iβ can be improved.

(5) Further, in the electric motor control device 10 according to the present embodiment, the intermediate timing is set at an electric angle of 15[°] which makes the intermediate timing set "at unequal intervals" to the switch timings before and after the intermediate timing. In this way, in the electric motor control device 10, the intermediate timing is the timing which is the timing between the consecutive switch timings and which is the timing "set at unequal intervals" to the consecutive switch timings and is the timing in which the electric angle movement amount between the switch timing just before the intermediate timing and the intermediate timing is different from the electric angle movement amount between the switch timing just after the intermediate timing and the intermediate timing. In this way, the current of the sensor phase can be sensed by the current sensor 13 at an arbitrary timing between the consecutive switch timings. Hence, the intermediate timing suitable for the operating state of the AC motor 2 can be set.

(6) Still further, in the case where the differential value $\Delta i\alpha$ of the $\alpha$ axis current $i\alpha$ is calculated on the basis of the amount of change in the electric angle movement amount $\Delta\theta e$ of the $\alpha$ axis current $i\alpha$, by taking into consideration that the waveform of the differential value $\Delta i\alpha$ of the $\alpha$ axis current $i\alpha$ has a phase delay of $(\theta e/2)$ with respect to the waveform of the actual $\beta$ axis current $i\beta$, the differential value $\Delta i\alpha$ of the $\alpha$ axis current $i\alpha$ is corrected by the use of the correction amount H corresponding to the phase delay of $(\theta e/2)$ to thereby find the $\beta$ axis current $i\beta$. In this way, the $\beta$ axis current $i\beta$ can be calculated with high accuracy. In this regard, the method of calculating the $\beta$ axis current $i\beta$, described in the present embodiment, is one example, and a method of calculating a $\beta$ axis current $i\beta$ is not limited to the method described in the present embodiment but the method described in the present embodiment may be modified as required, if the method can calculate the $\beta$ axis current $i\beta$ with high accuracy.

(7) Still further, by calculating the d axis current estimated value id_est and the q axis current estimated value iq_est on the basis of the current sensed value iw_sns of the sensor phase and the current estimated value iu_est of the other phase, the d axis current estimated value id_est and the q axis current estimated value iq_est can be calculated with high accuracy. The torque feedback control is performed by the use of the d axis current estimated value id_est and the q axis current estimated value iq_est, so that the AC motor 2 can be driven stably.

Other Embodiments (A) In the embodiment described above, one intermediate timing is set between the consecutive switch timings. However, the number of the intermediate timings to be set are not limited to this. M (not less than 2) intermediate timings may be set between the consecutive switch timings. In this case, as described above, the intermediate timing which is a timing between the consecutive switch timings and which is a timing "set at unequal intervals" to the consecutive timings is each of the M timings, which are timings except for a case where, when the timings are numbered from 1 • • • m (2≤m≤M) • • • to M in the order of time from the timing just after a former switch timing of the consecutive switch timings, all of an electric angle movement amount between the former switch timing and a 1-st timing, an electric angle movement amount between the 1-th timing and a 2-nd timing, • • •, an electric angle movement amount between an (m−1)-th timing and an m-th timing, an electric angle movement amount between the m-th timing and an (m+1)-th timing, • • • an electric angle movement amount between an (M−1)-th timing and an M-th timing, and an electric angle movement amount between the M-th timing and a latter switch timing of the consecutive switch timings are equal to each other.

(B) In the embodiment described above, the sensor phase of sensing the phase current by the current sensor is not limited to the W phase in the embodiment described above but may be the U phase of the V phase. Further, the estimation phase of calculating the current estimated value from the current sensed value of the sensor phase and the sensor phase reference current phase $\theta x$ is not limited to the U phase in the embodiment described above but may be the V phase or the W phase.

(C) In the embodiment described above is employed a method of estimating a current of a phase other than a sensor phase and of performing a dq transformation. However, a device for performing a dq transformation on the basis of the current sensed value of one phase is not limited to the method in the embodiment but a method of performing a dq transformation even by the current sensed value of only one phase, for example, may be newly created.

In this method, the step of outputting the current estimated value of the phase other than the sensor phase, as in S113 or S115 shown in FIG. 11, does not exist evidently but it is interpreted that an operation corresponding to this step is comprehensively performed in the dq transformation formula. However, as the result of a research made by the inventor, it is made clear that any method can produce the same result mathematically.

(D) The AC motor of the embodiments described above is the three-phase AC motor of a permanent magnet synchronous type but may be an induction motor or another synchronous motor in the other embodiments. Further, the AC motor of the embodiments described above may be the so-called motor generator having a function as an electric motor and a function as a generator but may be not have the function as the generator in the other embodiment.

(E) The control device of the AC motor according to the present disclosure is not limitedly applied to the system having one set of an inverter and an AC motor as the embodiments described above but may be applied to a system having two sets of an inverter and an AC motor. Further, the control device of the AC motor according to the present disclosure may be applied to a system of an electric train having a plurality of AC motors connected in parallel to one inverter.

(F) The control device of the AC motor according to the present disclosure is not limitedly applied to the AC motor of the hybrid vehicle having the construction shown in FIG. 1 but may be applied to an AC motor of an electrically driven vehicle having any construction. Further, the control device of the AC motor according to the present disclosure may be applied to an AC motor other than the AC motor of the electrically driven vehicle.

The above disclosure has the following aspects.

According to an aspect of the present disclosure, a control device of a three-phase AC motor includes: an inverter that drives the AC motor; a current sensor that senses a current flowing through a sensor phase of the AC motor; and a controller that includes a current estimation device. The current estimation device calculates a current phase based on the sensor phase, which is defined as a sensor-phase-standard current phase, according to an $\alpha$ axis current and a $\beta$ axis current in a fixed coordinate system. The fixed coordinate system is set by an $\alpha$ axis and a $\beta$ axis. The $\alpha$ axis is in a same direction as an axis of the sensor phase. The $\beta$ axis is orthogonal to the axis of the sensor phase. The current estimation device calculates a current estimated value of another phase other than the sensor phase according to the sensor-phase-standard current phase and a current sensed value of the sensor phase. The current sensed value of the sensor phase is sensed by the current sensor. The controller switches on and off a switching element of each phase of the inverter so as to control a current flowing through the AC motor. The current estimation device includes: a first calculator that calculates the $\alpha$ axis current according to the current sensed value of the sensor phase at every switch timing and every intermediate timing, the switch timing at which the switching element switches on or off, and the intermediate timing being different from the switch timing; and a second calculator that calculates a first differential value of the α axis current at every switch timing according to a change amount of the α axis current between a present switch timing and a previous switch timing. The second calculator calculates the β axis current according to the first differential value of the α axis current. The second calculator calculates a second differential value of the α axis current at every intermediate timing according to a change amount of the α axis current between a present intermediate timing and a previous intermediate timing. The second calculator calculates the β axis current according to the second differential value of the α axis current. The intermediate timing is set to have an unequal interval between two adjacent switch timings.

In the control device of the AC motor of the present invention, the sensor phase reference current phase is calculated on the basis of the α axis current and the β axis current in the fixed coordinate system (α-β coordinate system) based on the sensor phase, and the current estimated value of another phase other than the sensor phase is calculated on the basis of the sensor phase reference current phase and the current sensed value of the sensor phase. At this time, by paying attention to the fact that a phase difference between the α axis current and the β axis current is 90[°] and that the α axis current and the β axis current are in the relationship between a sine wave and a cosine wave, the α axis current is calculated on the current sensed value of the sensor phase and the β axis current is calculated on the basis of a differential value of the α axis current. In this way, the β axis current can be calculated without using a current command value of the other phase. Hence, the accuracy of calculation of the current estimated value of the other phase can be improved by taking into consideration the harmonic components of the actual current phase and the effect of variations that can be usually caused.

Further, the α axis current is calculated on the basis of the current sensed value of the sensor phase at each switch timing and at each intermediate timing which is a timing different from the switch timing and which is a timing between consecutive switch timings. The β axis current is calculated on the basis of the differential value of the α axis current, which is calculated on the basis of the amount of change in the α axis current between the switch timings at each switch timing, that is, the amount of change in the α axis current from the switch timing of this time to the switch timing of a past time, and the β axis current is calculated on the basis of the differential value of the α axis current, which is calculated on the basis of the amount of change in the α axis current between the intermediate timings at each intermediate timing, that is, the amount of change in the α axis current from the intermediate timing of this time to the intermediate timing of a past time. In this way, the β axis current can be calculated with high accuracy with being little affected by the current sensed value increasing and decreasing irregularly between the switch timing and the intermediate timing. Hence, the accuracy of calculation of the sensor phase reference current phase based on the α axis current and the β axis current can be improved.

Still further, in the control device of the AC motor of the present invention, the current and the electric angle are sensed at both timings of the switch timing, which is a timing when the switching elements are switched on/off, and the intermediate timing, which is a timing between the consecutive switch timings and which is a timing "set at unequal intervals" to the consecutive switch timings.

Here, the intermediate timing which is a timing between the consecutive switch timings and which is a timing "set at unequal intervals" to the consecutive switch timings is defined in the following manner.

In the case where one timing when the current and the electric angle are sensed exists between the consecutive switch timings, the intermediate timing, which is a timing between the consecutive switch timings and which is a timing "set at unequal intervals" to the consecutive switch timings, is the one timing which is set in such a way that an electric angle movement amount between a switch timing just before the one timing and the one timing is different from an electric angle movement amount between a switch timing just after the one timing and the one timing.

Further, in the case where M (not less than 2) timings when the current and the electric angle are sensed exist between consecutive switch timings, an intermediate timing which is a timing between the consecutive switch timings and which is a timing "set at unequal intervals" to the consecutive timings is each of the M timings, which are timings except for a case where, when the timings are numbered from 1 • • • m (2≤m≤M) • • • to M in the order of time from the timing just after a former switch timing of the consecutive switch timings, all of an electric angle movement amount between the former switch timing and a 1-st timing, an electric angle movement amount between the 1-th timing and a 2-nd timing, • • •, an electric angle movement amount between an (m−1)-th timing and an m-th timing, an electric angle movement amount between the m-th timing and an (m+1)-th timing, • • • an electric angle movement amount between an (M−1)-th timing and an M-th timing, and an electric angle movement amount between the M-th timing and a latter switch timing of the consecutive switch timings are equal to each other. In this way, the current of the sensor phase can be sensed by the current sensor at an arbitrary timing between the consecutive switch timings. Hence, a timing suitable for the operating state of the AC motor can be set.

Alternatively, when the current estimation device calculates the β axis current, the current estimation device may correct the first differential value of the α axis current using a correction amount, which corresponds to a phase delay of a half of a time interval between two adjacent switch timings, or corrects the second differential value of the α axis current using a correction amount, which corresponds to a phase delay of a half of a time interval between two adjacent intermediate timings. Further, the current estimation device may calculate a d-axis current estimated value and a q-axis current estimated value based on the current sensed value of the sensor phase and the current estimated value of the another phase, and the controller may control the current flowing through the AC motor using the d-axis current estimated value and the q-axis current estimated value. Furthermore, the controller may control the current flowing through the AC motor using a square wave pulse. Here, the square wave pulse has a ratio between a voltage high level period and a voltage low level period in one current cycle, and the ratio is 1:1. Alternatively, the intermediate timing may be set to have the unequal interval between two adjacent switch timings in such a manner that an electric angle movement amount between a present switch timing and the intermediate timing is different from an electric angle movement amount between the intermediate timing and a previous switch timing.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A control device of a three-phase AC motor comprising:
an inverter that drives the AC motor;
a current sensor that senses a current flowing through a sensor phase of the AC motor; and
a controller that includes a current estimation device,
wherein the current estimation device calculates a current phase based on the sensor phase, which is defined as a sensor-phase-standard current phase, according to an α axis current and a β axis current in a fixed coordinate system,
wherein the fixed coordinate system is set by an α axis and a β axis,
wherein the α axis is in a same direction as an axis of the sensor phase,
wherein the β axis is orthogonal to the axis of the sensor phase,
wherein the current estimation device calculates a current estimated value of another phase other than the sensor phase according to the sensor-phase-standard current phase and a current sensed value of the sensor phase,
wherein the current sensed value of the sensor phase is sensed by the current sensor,
wherein the controller switches on and off a switching element of each phase of the inverter so as to control a current flowing through the AC motor,
wherein the current estimation device includes:
 a first calculator that calculates the α axis current according to the current sensed value of the sensor phase at every switch timing and every intermediate timing, the switch timing at which the switching element switches on or off, and the intermediate timing being different from the switch timing; and
 a second calculator that calculates a first differential value of the α axis current at every switch timing according to a change amount of the α axis current between a present switch timing and a previous switch timing,
wherein the second calculator calculates the β axis current according to the first differential value of the α axis current,
wherein the second calculator calculates a second differential value of the α axis current at every intermediate timing according to a change amount of the α axis current between a present intermediate timing and a previous intermediate timing,
wherein the second calculator calculates the β axis current according to the second differential value of the α axis current, and
wherein the intermediate timing is set to have an unequal interval between two adjacent switch timings.

2. The control device of the AC motor according to claim 1, wherein, when the current estimation device calculates the β axis current, the current estimation device corrects the first differential value of the α axis current using a correction amount, which corresponds to a phase delay of a half of a time interval between two adjacent switch timings, or corrects the second differential value of the α axis current using a correction amount, which corresponds to a phase delay of a half of a time interval between two adjacent intermediate timings.

3. The control device of the AC motor according to claim 1, wherein the current estimation device calculates a d-axis current estimated value and a q-axis current estimated value based on the current sensed value of the sensor phase and the current estimated value of the another phase, and
wherein the controller controls the current flowing through the AC motor using the d-axis current estimated value and the q-axis current estimated value.

4. The control device of the AC motor according to claim 1, wherein the controller controls the current flowing through the AC motor using a square wave pulse,
wherein the square wave pulse has a ratio between a voltage high level period and a voltage low level period in one current cycle, and
wherein the ratio is 1:1.

5. The control device of the AC motor as claimed in claim 1,
wherein the intermediate timing is set to have the unequal interval between two adjacent switch timings in such a manner that an electric angle movement amount between a present switch timing and the intermediate timing is different from an electric angle movement amount between the intermediate timing and a previous switch timing.

* * * * *